United States Patent
Huang et al.

(10) Patent No.: US 12,373,691 B1
(45) Date of Patent: Jul. 29, 2025

(54) EXECUTING SUBLAYERS OF A FULLY-CONNECTED LAYER

(71) Applicant: Amazon Technologies, Inc., Seattle, WA (US)

(72) Inventors: Randy Huang, Morgan Hill, CA (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/357,876

(22) Filed: Jul. 24, 2023

Related U.S. Application Data

(63) Continuation of application No. 15/934,523, filed on Mar. 23, 2018, now Pat. No. 11,868,878.

(51) Int. Cl.
| | |
|---|---|
| G06N 3/08 | (2023.01) |
| G06F 18/2413 | (2023.01) |
| G06F 18/2431 | (2023.01) |
| G06N 5/046 | (2023.01) |

(52) U.S. Cl.
CPC .......... G06N 3/08 (2013.01); G06F 18/2413 (2023.01); G06F 18/2431 (2023.01); G06N 5/046 (2013.01)

(58) Field of Classification Search
CPC .................................. G06N 3/08; G06N 5/04
See application file for complete search history.

(56) References Cited

U.S. PATENT DOCUMENTS

| | | | |
|---|---|---|---|
| 5,822,742 A * | 10/1998 | Alkon | G06N 3/04 706/31 |
| 10,474,925 B2 * | 11/2019 | Huang | G06F 18/24133 |
| 2008/0144927 A1 | 6/2008 | Hashimoto et al. | |
| 2017/0068887 A1 | 3/2017 | Kwon | |
| 2017/0212983 A1 * | 7/2017 | Cai | C12Q 1/6841 |
| 2018/0129934 A1 | 5/2018 | Tao et al. | |
| 2019/0080176 A1 * | 3/2019 | Lan | G06V 20/46 |

OTHER PUBLICATIONS

Teerapittayanon et al., "BranchyNet: Fast Inference via Early Exiting from Deep Neural Networks", 2016, 2016 23rd International Conference on Pattern Recognition (ICPR), pp. 2464-2469. (Year: 2016).*
U.S. Appl. No. 15/934,523, "Advisory Action," mailed Dec. 19, 2022, 6 pages.
U.S. Appl. No. 15/934,523, "Final Office Action," mailed Sep. 22, 2022, 28 pages.

(Continued)

Primary Examiner — Alexey Shmatov
Assistant Examiner — Clint Mullinax
(74) Attorney, Agent, or Firm — Kilpatrick Townsend & Stockton LLP

(57) ABSTRACT

Disclosed herein are techniques for implementing a large fully-connected layer in an artificial neural network. The large fully-connected layer is grouped into multiple fully-connected subnetworks. Each fully-connected subnetwork is configured to classify an object into an unknown class or a class in a subset of target classes. If the object is classified as the unknown class by a fully-connected subnetwork, a next fully-connected subnetwork may be used to further classify the object. In some embodiments, the fully-connected layer is grouped based on a ranking of target classes.

19 Claims, 12 Drawing Sheets

(56) References Cited

OTHER PUBLICATIONS

U.S. Appl. No. 15/934,523, "Non-Final Office Action," mailed Mar. 24, 2022, 24 pages.
U.S. Appl. No. 15/934,523, "Non-Final Office Action," mailed Jan. 23, 2023, 29 pages.
U.S. Appl. No. 15/934,523, "Notice of Allowance," mailed May 16, 2023, 12 pages.
Teerapittayanon et al., "BranchyNet: Fast Inference via Early Exiting from Deep Neural Networks", 23rd International Conference on Pattern Recognition (ICPR), Available Online At: https://ieeexplore.ieee.org/stamp/stamp.jsp?tp=&arnumber=7900006, Dec. 2016, pp. 2464-2469.

* cited by examiner

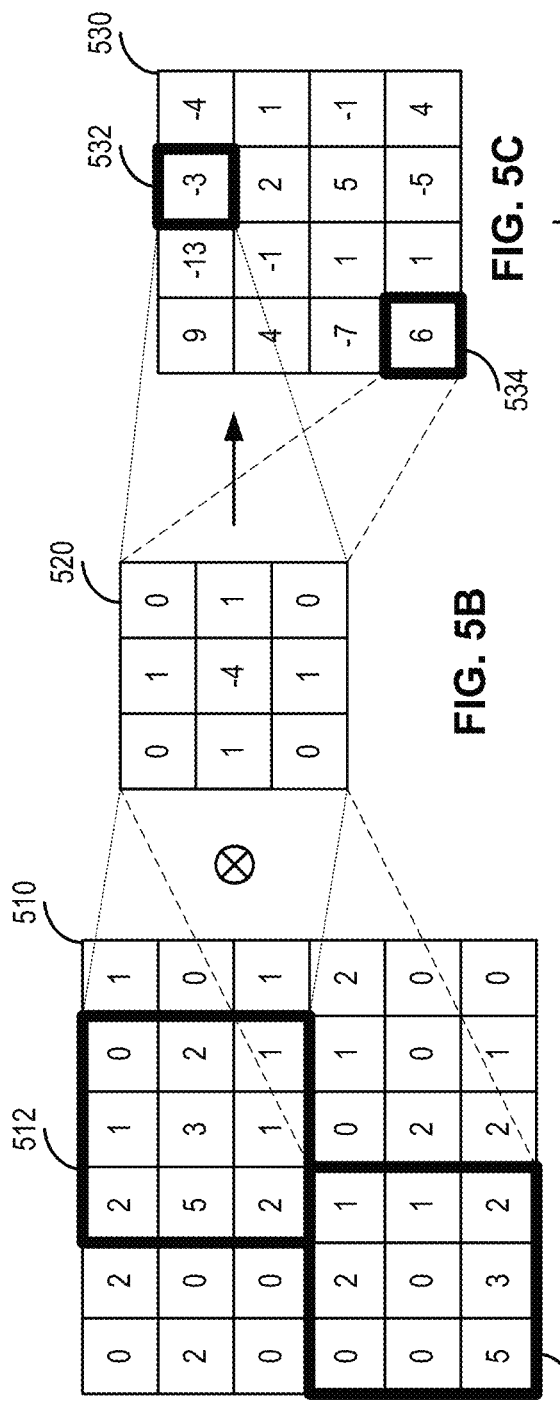

EXECUTING SUBLAYERS OF A FULLY-CONNECTED LAYER

CROSS-REFERENCE TO RELATED APPLICATIONS

This application is a continuation of and claims priority to U.S. application Ser. No. 15/934,523, filed Mar. 23, 2018, and entitled "EXECUTING SUBLAYERS OF A FULLY-CONNECTED LAYER," the contents of which are hereby incorporated by reference in their entireties for all purposes.

BACKGROUND

Artificial neural networks are computing systems with an architecture based on biological neural networks. Artificial neural networks can be trained using training data to learn how to perform a certain task, such as identifying or classifying objects (e.g., physical items, activities, characters, patterns, etc.) from images, videos, or other data. An artificial neural network, such as a deep neural network, may include multiple layers of processing nodes. Each processing node on a layer can perform computations on input data generated by processing nodes on the preceding layer to generate output data. For example, a processing node may perform a set of arithmetic operations such as multiplications and additions to generate an intermediate output, or perform post-processing operations on the intermediate output to generate a final output. At the last stage of an artificial neural network, such as a convolutional neural network (CNN) or a long short-term memory (LSTM) network, one or more fully-connected (FC) layers may be used to make the final decision based on a combination of the output data generated by processing nodes on the preceding layer, where each processing node on one layer of a fully-connected layer may have connections to all processing nodes on a preceding layer in the fully-connected layer.

BRIEF DESCRIPTION OF THE DRAWINGS

Various embodiments in accordance with the present disclosure will be described with reference to the drawings, in which:

FIGS. 5A-5E illustrate example convolution, non-linear activation, and pooling operations performed on example input pixel;

DETAILED DESCRIPTION

Figure 1:
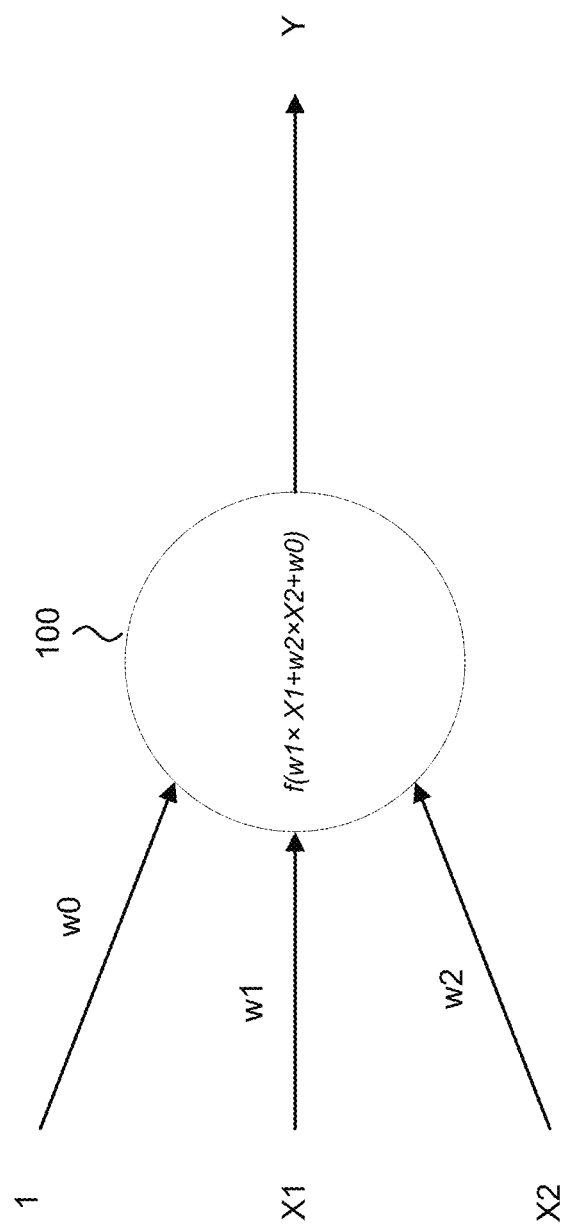
FIG. 1 illustrates the operations of a network node in an artificial neural network.

Techniques disclosed herein relate generally to artificial neural network, and more specifically, to reducing the complexity (e.g., memory and bandwidth requirements) of the artificial neural network, in particular, the fully-connected layer or other classification function layer.

An artificial neural network (also referred to as "neural network") may include multiple processing nodes arranged on two or more layers, where processing nodes on one layer may connect to processing nodes on another layer. The processing nodes can be divided into layers including, for example, an input layer, a number of intermediate layers (also known as hidden layers), and an output layer. Each processing node on a layer (e.g., an input layer, an intermediate layer, etc.) may receive a sequential stream of input data elements, multiply each input data element with a weight, compute a weighted sum of the input data elements, and forward the weighted sum to the next layer. At the last stage of an artificial neural network, such as a convolutional neural network (CNN) or a recurrent neural network (RNN, such as a long short-term memory (LSTM) network), one or more layers in a fully-connected (FC) layer may be used to make the final decision based on a combination of the output data generated by processing nodes on the preceding layer, where each processing node on a fully-connected layer may have connections to all processing nodes on the preceding layers. The size of the last layer of the fully-connected layer can be very large in order to, for example, classify a large number of different objects. As such, the number of connections between the last layer of the fully-connected layer and the preceding layer of the fully-connected layer may be large. In order to implement the fully-connected layer, a large memory space and a high bandwidth bus may be required, which may limit the performance of the FC layer when the memory space or the data transfer bandwidth of the underlying hardware is limited.

According to some embodiments, rather than classifying an object as one class among all possible target classes in a single classification step at the last layer of the fully-connected layer, the possible target classes may be divided into multiple (e.g., K) smaller groups. In each classification step, the object to be classified may be classified as one target class in a smaller group. If the first classification step fails to confidently classify the object as a target class in a first group, a second classification step may be performed to try to confidently classify the object as a target class in a second group of target classes. Additional classification steps may be performed until the object can be confidently classified as a target class. As a result, the number of weights used and the number of calculations in each classification step may be reduced by a factor of K. Thus, a device with limited memory space and computation power may be able to handle the classification process.

According to some embodiments, the target classes may be grouped based on certain criteria to reduce the average number of classification steps (and time) needed to classify an object. For example, the target classes may be ranked based on popularity or probability, and may then be grouped into the groups or subsets based on the ranking. This may increase the chance that the object may be confidently classified in the first classification step, and thus may reduce the average number of classifications (and time) needed to classify the object.

According to some embodiments, a new class may be combined with each smaller target class group in order to determine whether the object to be classified belongs to one of the target classes in the smaller group or not and to avoid overconfidently classifying the object. The new class may be a class indicating that the class of the object is "unknown," "none of the above," or "not in this group" based on the current classification step, and thus may need to be identified from another target class group.

According to certain embodiments, a fully-connected layer in an artificial neural network for implementing the methods discussed herein may include an input layer and an output layer, where the nodes on the output layer may be grouped into multiple groups rather than a large group that includes all nodes. The input layer may include a plurality of nodes each connected to all nodes in each of the multiple groups, and each node in every group of the multiple groups may be connected to all nodes on the input layer. As such, the input layer and each group of the multiple groups of nodes may form a respective fully-connected subnetwork (also referred to as a layer subnetwork). Each of the fully-connected subnetworks may be trained independently and used to classify an object in a classification step. In this way, the number of weights used and the number of multiplications performed in each classification step may be reduced. Thus, both the training and the inference can be performed faster. In some embodiments, the nodes on the last fully-connected layer may be grouped according to certain criteria such that the nodes corresponding to more popular or more probable classes may be included in the groups that may be used in earlier stages of the classification process. This may help to reduce the average number of classification steps used to confidently classify an object.

As used herein, a connection between two nodes may not necessarily mean that there is a physical connection between two nodes. In some embodiments, the connection may refer to a relationship between the value associated with one node and the value associated with another node. For example, a connection between two nodes may be represented by a coefficient (i.e., a weight) indicating how the value on one node is weighted in determining the value on the other node.

As used herein, a network node, a node, a processing node, a neural network node, or a neuron may not necessarily refer to a hardware unit or a physical device. In some embodiments, a network node, a node, a processing node, a neural network node, or a neuron may refer to a set of processing elements (PEs) configured to perform a set of arithmetic operations, such as a weighted sum of a set of input values. In some embodiments, a network node, a node, a processing node, a neural network node, or a neuron may refer to a set of arithmetic operations, such as a weighted sum of a set of input values.

As used herein, an object may include, for example, a physical item (e.g., an animal, a plant, a person, a character, etc.), an activity (e.g., a gesture, a facial expression, a motion, etc.), a signal (e.g., an audio signal representing a word, an electrical signal detected by a sensor, etc.), a pattern (e.g., in images, behaviors, activities, events, etc.), or any other item that may belong to one of multiple different classes according certain classification standards.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described. The figures and description are not intended to be restrictive. The word "example" is used herein to mean "serving as an example, instance, or illustration." Any embodiment or design described herein as "example" is not necessarily to be construed as preferred or advantageous over other embodiments or designs.

An artificial neural network (ANN) is a computational system that is inspired by the way biological neural networks in the human brain process information. Artificial neural networks have been used in machine learning research and industrial applications and have achieved many breakthrough results in, for example, image recognition, speech recognition, computer vision, text processing, etc. The basic unit of computation in a neural network is the neuron (also referred to as a node). A neuron may receive input from some other neurons or an external source and compute an output. Each input may have an associated weight (w), which may be assigned based on the importance of the input relative to other inputs. The neuron may also apply a function (e.g., a nonlinear function) to the weighted sum of its inputs.

FIG. 1 illustrates the operations of a node 100 in an artificial neural network. Node 100 may take numerical inputs X1 and X2 and may have weights w1 and w2 associated with those inputs. Additionally, there may be another input (referred to as a bias), such as 1, with a weight w0 associated with it. The main function of the bias is to provide every node with a trainable constant value (in addition to the normal inputs that the node receives). The bias value may allow one to shift the activation function to the left or right. It is noted that even though only three inputs to node 100 are shown in FIG. 1, in various implementations, a node may include tens, hundreds, thousands, or more inputs and associated weights.

The output Y from node 100 may be computed by:

$$Y=f(w1\times X1+w2\times X2+w0),$$

where function $f$ may be a non-linear function that is often referred to as an activation function. The purpose of the activation function is to introduce non-linearity into the output of a neural network node because most real world functions are non-linear and it is desirable that the neurons can learn these non-linear representations. The activation function may take a single number and perform a certain fixed mathematical operation on it. Several activation functions may be used in an artificial neural network. One example activation function is the sigmoid function $\sigma(x)$, which takes a real-valued input and transforms it into a value between 0 and 1:

$$\sigma(x)=1/(1+\exp(-x)).$$

Another example activation function is the tanh function, which takes a real-valued input and transforms it into a value within the range of $[-1, 1]$:

$$\tanh(x)=2\sigma(2x)-1$$

A third example activation function is the rectified linear unit (ReLU) function. The ReLU function takes a real-valued input and thresholds it above zero (i.e., replacing negative values with zero):

$$f(x)=\max(0,x).$$

Another example activation function is the leaky ReLU function, which may be defined as:

Leaky-ReLU($x$)=max(0,$x$)+αmin(0,$x$), where α may be a pre-determined parameter or a parameter that can be learned.

A feedforward neural network is a type of artificial neural network. It may include multiple nodes, such as nodes 100 described above with respect to FIG. 1, arranged in layers. Nodes from adjacent layers may have connections or edges between them. These connections may have corresponding weights associated with them. The information moves from the input nodes, through the hidden nodes (if any) and to the output nodes. There are no circles or loops in the network. In contrast, recurrent Neural Networks (e.g., a long short-term memory (LSTM) network) may include connections between the nodes to form a circle or loop.

Figure 2:
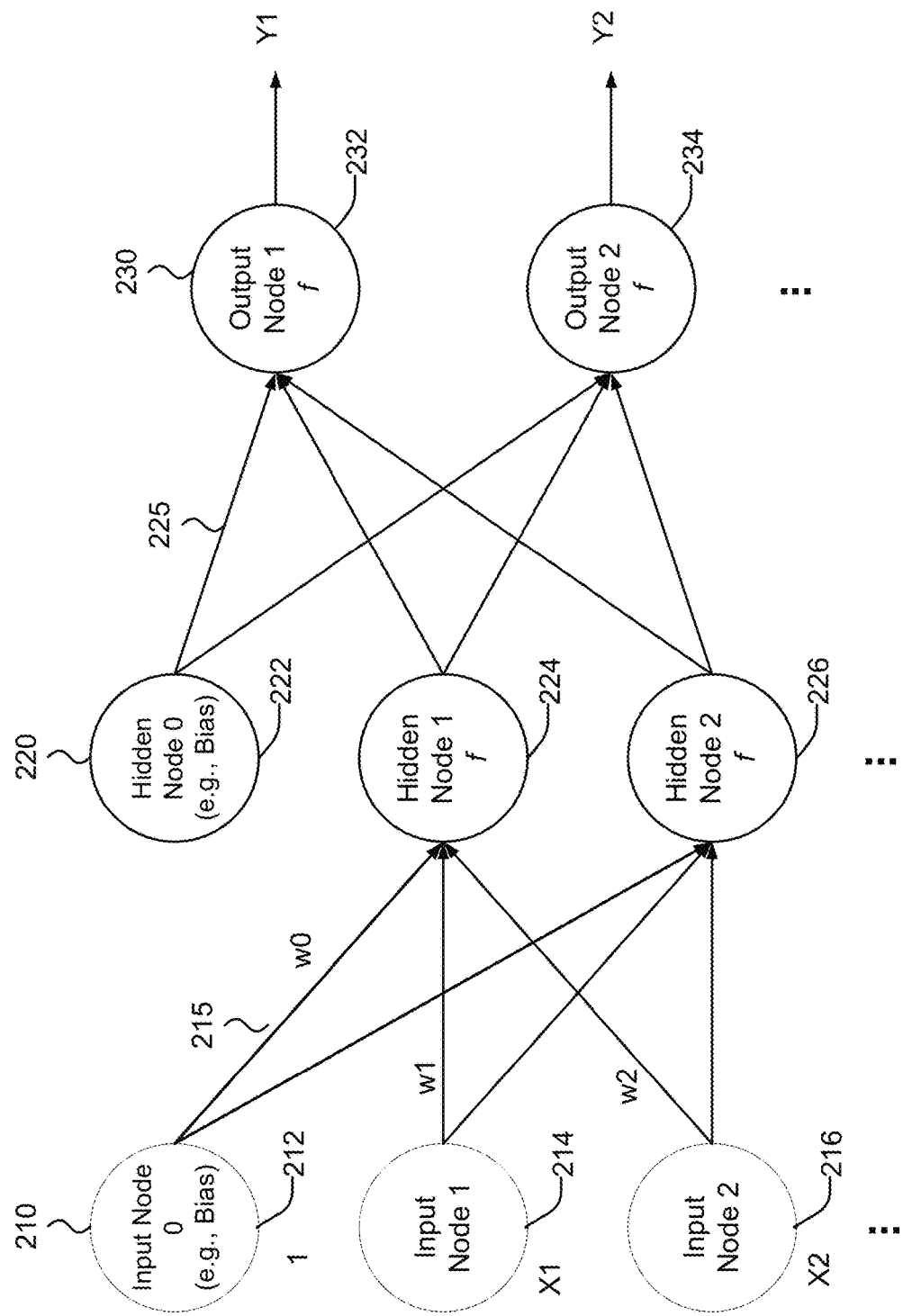
FIG. 2 illustrates an example feedforward neural network.

FIG. 2 illustrates an example feedforward neural network 200. Feedforward neural network 200 may include an input layer 210, a hidden (or intermediate) layer 220, and an output layer 230. In many implementations, feedforward neural network 200 may include two or more hidden layers and may be referred to as a deep neural network. A neural network with a single hidden layer may generally be sufficient to model any continuous function. However, such a network may need an exponentially larger number of nodes when compared to a neural network with multiple hidden layers. It has been shown that a deeper neural network can be trained to perform much better than a comparatively shallow network.

Input layer 210 may include a plurality of input nodes (e.g., nodes 212, 214, and 216) that may provide information (i.e., input data) from the outside world to the network. Input nodes may pass on the information to the next layer, and no computation may be performed by the input nodes. Hidden layer 220 may include a plurality of nodes, such as nodes 222, 224, and 226. The nodes in the hidden layer may have no direct connection with the outside world (hence the name "hidden"). They perform computations and transfer information from the input nodes to the next layers (e.g., another hidden layer or output layer 230). While a feedforward neural network may have a single input layer and a single output layer, it may have zero or multiple hidden layers. Output layer 230 may include a plurality of output nodes that are responsible for computing and transferring information from the network to the outside world, such as recognizing certain objects or activities, or determining a condition or an action.

As shown in FIG. 2, in a feedforward neural network, a node (except the bias node if any) may have connections to all nodes (except the bias node if any) in the immediately preceding layer and the immediate next layer. Thus, the layers may be referred to as fully-connected layers. All connections between nodes may have weights associated with them, even though only some of these weights are shown in FIG. 2. For a complex network, there may be hundreds or thousands of nodes and thousands or millions of connections between the nodes.

As described above, a feedforward neural network may include zero (referred to as a single layer perceptron), or one or more hidden layers (referred to as a multi-layer perceptron (MLP)). Even though FIG. 2 only shows a single hidden layer in the multi-layer perceptron, a multi-layer perceptron may include one or more hidden layers (in addition to one input layer and one output layer). A feedforward neural network with many hidden layers may be referred to as a deep neural network. While a single layer perceptron may only learn linear functions, a multi-layer perceptron can learn non-linear functions.

In the example shown in FIG. 2, node 212 may be a bias node having a value of 1 or may be a regular input node. Nodes 214 and 216 may take external inputs X1 and X2, which may be numerical values depending upon the input dataset. As discussed above, no computation is performed on input layer 210, and thus the outputs from nodes 212, 214, and 216 on input layer 210 are 1, X1, and X2, respectively, which are fed into hidden layer 220.

In the example shown in FIG. 2, node 222 may be a bias node having a value of 1 or may be a regular input node. The outputs of nodes 224 and 226 in hidden layer 220 may depend on the outputs from input layer 210 (i.e., 1, X1, X2, etc.) and weights associated with connections 215. The outputs from hidden nodes 224 or 226 may be calculated as described above with respect to FIG. 1. For example, the output from node 224 may be determined by $f(w1 \times X1 + w2 \times X2 + w0)$, where $f$ is an activation function as described above. Thus, the computations on each layer may be described as a multiplication of an input matrix and a weight matrix. The outputs from the hidden nodes may then be fed to the output nodes on output layer 230.

Output layer 230 in the example shown in FIG. 2 may include nodes 232 and 234, which may take inputs from hidden layer 220 and perform similar computations as the hidden nodes using weights associated with connections 225. The calculation results (Y1 and Y2) are the outputs of the multi-layer perceptron. In some implementations, in an MLP for classification, a Softmax function may be used as the activation function in the output layer to ensure that the outputs are probabilities and add up to 1. The Softmax function takes a vector of real-valued scores and maps it to a vector of values between zero and one that sum to one.

For a given set of input features X=(x1, x2, . . . ) and a target Y, a multi-layer perceptron can learn the relationship between the features and the target, for either classification or regression. A multi-layer perceptron may learn using a backpropagation algorithm. Backward propagation of errors (often referred to as BackProp) is one of several ways in which an artificial neural network can be trained. BackProp may be a supervised training scheme that learns from labeled training data and errors at the nodes by changing parameters of the neural network to reduce the errors.

As described above, the connections between nodes of adjacent layers in an artificial neural network have weights associated with them, where the weights may determine what the output vector is for a given input vector. The learning or training process may assign appropriate weights for these connections. In some implementations, the initial values of the weights may be randomly assigned. For every input in a training dataset, the output of the artificial neural network is observed and compared with the expected output, and the error between the expected output and the observed output is propagated back to the previous layer. The weights are adjusted accordingly based on the error. This process is repeated until the output error is below a predetermined threshold.

The backward propagation of errors may be based on the chain-rule used for nested functions y=$f(g(x))$:

$$\frac{\partial y}{\partial x} = \frac{\partial f}{\partial x} = \frac{\partial f}{\partial g} \frac{\partial g}{\partial x},$$

where $$g(x) = \sum_{i=0}^{n} x_i w_i, \frac{\partial f}{\partial g}$$

is the derivative of the activation function, and $$\frac{\partial g}{\partial x}$$

may be proportional to weight w. The errors at the output nodes may be calculated and propagated back through the network to calculate the gradients. An optimization method, such as Gradient Descent, may be used to adjust the weights in the network to reduce the errors at the output layer. Backpropagation may be computationally cheaper than forward propagation as forward propagation may involve successively multiplying large matrices on each layer until multiplying a large matrix by a vector on the output layer. The backpropagation may start with multiplying a matrix by a first vector to get a second vector, multiplying another matrix by the second vector to get a third vector, and so forth. In other words, the backpropagation uses more efficient matrix-vector multiplications instead of matrix-matrix multiplications.

After the weight adjustment, the network should perform better than before for the same input because the weights have now been adjusted to minimize the errors. This process may be repeated for all training samples in the training dataset to learn from these samples.

In many situations, using the feedforward neural network as described above for real-world application, such as image classification, may not be practical. For example, for a two-dimensional (2-D) image with 200×200 pixels, 40,000 input nodes may be used in the neural network. If a hidden layer has 20,000 nodes, the size of the matrix of input weights would be 40,000×20,000 (or 800 million elements). If each weight is a 32-bit (i.e., 4-byte) floating point value, the total memory used for the weights would be 3.2 GB. This is just for the first layer. As the number of layers increases, the size of the weights may increase as well. In addition, vectorizing an image using individual pixels ignores the complex 2-D spatial structure of the image.

One way to overcome these issues is to use convolutional neural networks that perform 2-D convolutions using smaller convolutional filters instead of the large matrix multiplications as described above. Learning a set of convolutional filters (e.g., 11×11 matrices) may be much easier and faster than learning a large matrix (e.g., 40,000×20,000). 2-D convolutions can also naturally take the 2-D structure of images into account. Convolutional neural networks can also be described as feedforward neural networks with local connectivity and weight sharing. The local connectivity refers to the fact that a convolutional filter may have much smaller dimensions than the image it operates on, in contrast to the global connectivity using vectorized images in the input layer. The weight sharing is due to the fact that a same filter may be used across the image when performing the convolution, which means that a same local filter is used on many locations in the image. In other words, the weights between all filtering for different locations in the image are shared.

Convolutional neural networks (also referred to as ConvNets or CNNs) are a type of neural networks that are very effective in areas such as image recognition and classification. For example, CNNs may be used to identify faces, objects, and traffic signs for use in robots and self-driving cars. CNNs may be used in natural language processing tasks (such as sentence classification) as well. LeNet developed by Yann LeCun et al. in 1990s for hand-written number recognition is one of the first convolutional neural networks that helped propel the field of deep learning. Several new architectures have been proposed in recent years to improve over the LeNet, but they all use the main concepts from the LeNet.

Figure 3:
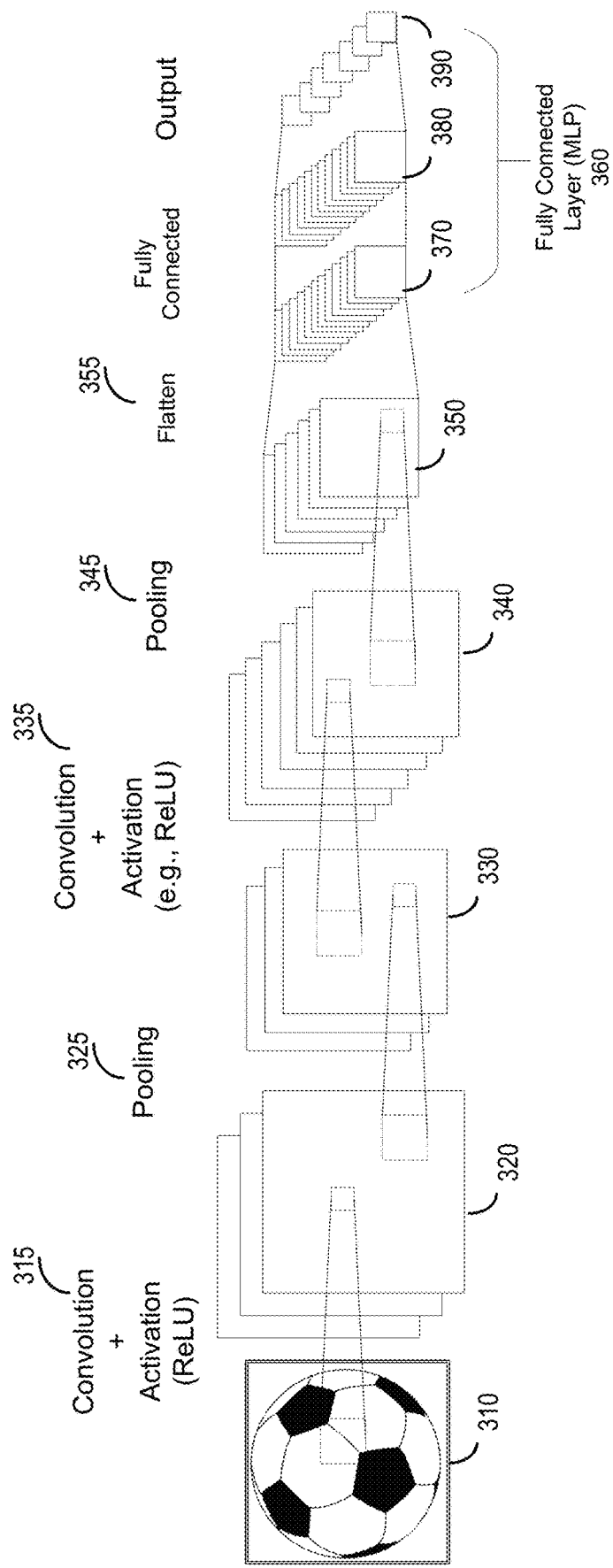
FIG. 3 illustrates an example convolutional neural network (CNN) for image or other object classification.

FIG. 3 illustrates an example convolutional neural network (CNN) 300 for image or object classification. CNN 300 may include four main operations: (1) convolution; (2) non-linearity function (e.g., ReLU); (3) pooling or subsampling; and (4) classification (fully-connected layer). These operations may be the basic building blocks of every convolutional neural network. Different CNNs may have different combinations of these four main operations.

The image to be classified, such as input image 310, may be represented as a matrix of pixel values. Input image 310 may include multiple channels, each channel representing a certain component of the image. For example, an image from a digital camera may have a red channel, a green channel, and a blue channel. Each channel may be represented by a 2-D matrix of pixels having pixel values in the range of 0 to 255 (i.e., 8-bit). A gray-scale image may have only one channel. In the following description, the processing of a single image channel representing an image using CNN 300 is described. Other channels may be processed similarly.

As shown in FIG. 3, input image 310 may be processed by a first convolution layer 315 using a first filter. More detail of the convolution is described below with respect to FIGS. 4A and 4B. First convolution layer 315 may also perform a non-linear function (e.g., ReLU) as described above. An output matrix 320 from first convolution layer 315 may have smaller dimensions than input image 310, and may be referred to as the convolved feature, activation map, or feature map. First convolution layer 315 may perform convolutions on input image 310 using multiple filters to generate multiple output matrices (or feature maps) 320. The number of filters used may be referred to as the depth of the convolution layer. In the example shown in FIG. 3, first convolution layer 315 may have a depth of three. Output matrix (or feature map) 320 may be passed to a pooling layer 325, where output matrix 320 may be subsampled or downsampled to generate a matrix 330. More detail of the pooling operation is described below with respect to FIGS. 4A and 4B.

Matrix 330 may be processed by a second convolution layer 335 using a filter. A non-linear function (e.g., ReLU) may also be performed by the second convolution layer 335 as described above. An output matrix 340 (or feature map) from second convolution layer 335 may have smaller dimensions than matrix 330. Second convolution layer 335 may perform convolutions on matrix 330 using multiple filters to generate multiple output matrices (or feature maps) 340. In the example shown in FIG. 3, second convolution layer 335 may have a depth of six. Output matrix 340 may be passed to a pooling layer 345, where output matrix 340 may be subsampled or down-sampled to generate a matrix 350.

The two-dimensional output matrices 350 from pooling layer 345 may be flattened to a one-dimensional (1-D) vector by a flatten layer 355, and passed through a fully-connected layer 360 (i.e., a multi-layer perceptron (MLP)) as described in FIG. 2. Fully-connected layer 360 may include an input layer 370 (such as input layer 210 of FIG. 2) that takes the –D output vector from flatten layer 355. Fully-connected layer 360 may also include a hidden layer 380 (such as hidden layer 220 of FIG. 2) and an output layer 390 (such as output layer 230 of FIG. 2). Fully-connected layer 360 may classify the object in input image 310 into one of several categories using feature maps or matrix 350 and, for example, a Softmax function. Thus, the number of nodes on output layer 390 may be equal to the number of target classes to be classified, where each output node may correspond to one target class.

The operation of the fully-connected layer may be represented by matrix multiplications. For example, if there are M nodes on input layer 370 and N nodes on hidden layer 380, where the input $X=[x_1, x_2, x_3, \ldots, x_M]$, and the weights of the connections between the M nodes on input layer 370 and the N nodes on hidden layer 380 can be represented by:

$$W = \begin{bmatrix} w_{11} & w_{12} & w_{13} & \ldots & w_{1N} \\ w_{21} & w_{22} & w_{23} & \ldots & w_{2N} \\ w_{31} & w_{32} & w_{33} & \ldots & w_{3N} \\ \ldots & \ldots & \ldots & \ldots & \ldots \\ w_{M1} & w_{M2} & w_{M3} & \ldots & w_{MN} \end{bmatrix}.$$

The output Y of hidden layer 380 may be determined by:

$$Y = X \times W = [x_1, x_2, x_3, \ldots, x_M] \times \begin{bmatrix} w_{11} & w_{12} & w_{13} & \ldots & w_{1N} \\ w_{21} & w_{22} & w_{23} & \ldots & w_{2N} \\ w_{31} & w_{32} & w_{33} & \ldots & w_{3N} \\ \ldots & \ldots & \ldots & \ldots & \ldots \\ w_{M1} & w_{M2} & w_{M3} & \ldots & w_{MN} \end{bmatrix} = [y_1, y_2, y_3, \ldots, y_N].$$

When M inputs for each sample of a batch of K samples are received at the fully-connected layer, the inputs may be represented by a K×M matrix for the K samples. The outputs Y of hidden layer 380 may include K×N elements and may be determined by a 2-D matrix multiplication.

The convolution operations in a CNN may be used to extract features from input image 310. The convolution operations preserve the spatial relationship between pixels by extracting image features using small regions of the input image. In a convolution, a matrix (referred to as a filter, a kernel, or a feature detector) may slide over the input image (or processed pixel array) at a certain step (referred to as the stride). For every position (or step), element-wise multiplications between the filter matrix and the overlapped matrix in the input image may be calculated and summed to get a final value that represents a single element of an output matrix 320, which may be referred to as the convolved feature, activation map, or feature map. Thus, a filter may act as a feature detector from the original input image.

Figure 4A:
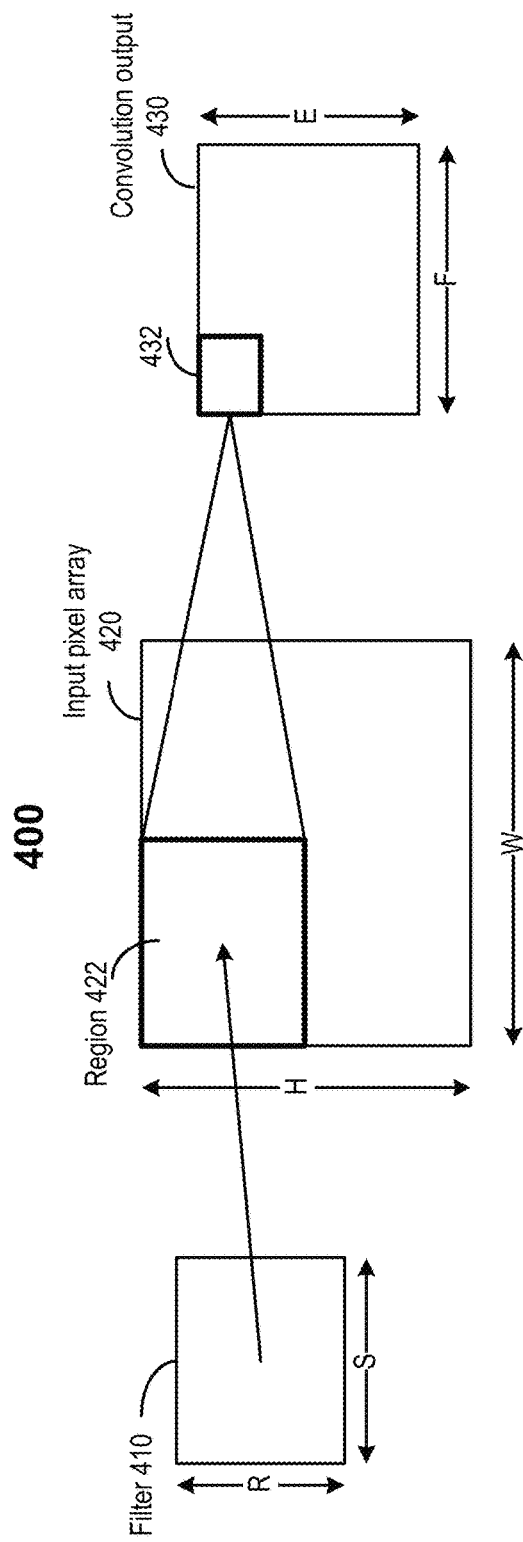
FIGS. 4A and 4B illustrate the convolution operations performed on an input pixel array using a filter by a convolution layer in a convolutional neural network.
Figure 4B:
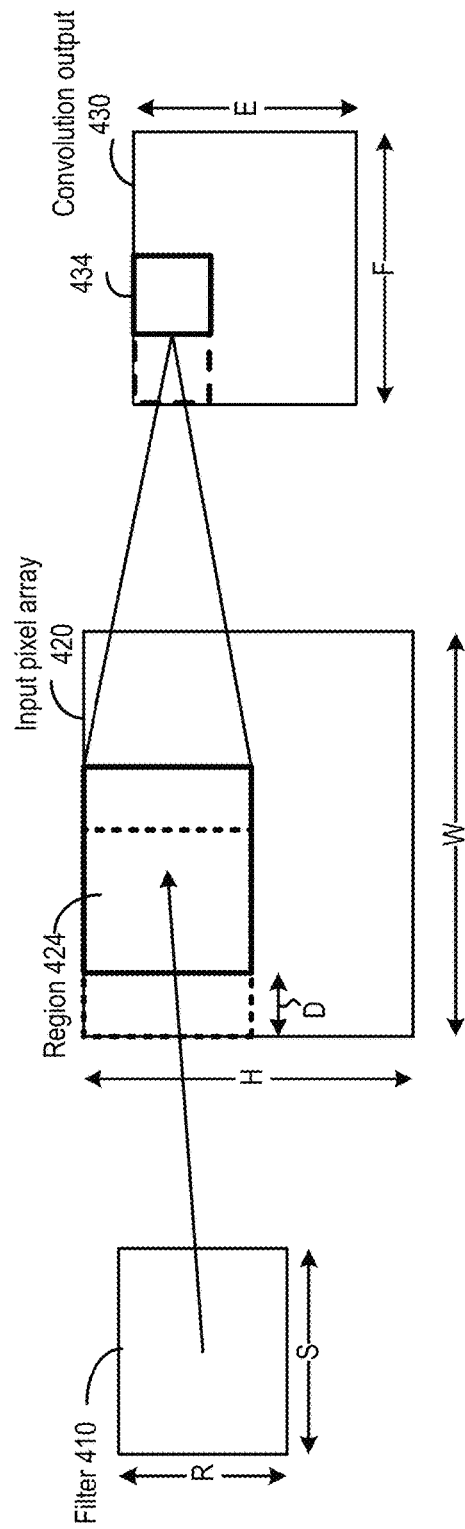

FIGS. 4A and 4B illustrate the convolution operations performed on an input pixel array 420 using a filter 410 by a convolution layer in a convolutional neural network. Input pixel array 420 may include an input image, a channel of an input image, or a feature map generated by another convolutional layer or pooling layer. FIG. 4A illustrates the convolution operation performed on a first region 422 of input pixel array 420 at a first step. FIG. 4B illustrates the convolution operation performed on a second region 424 of input pixel array 420 at a second step after sliding filter 410 by a stride.

Filter 410 may include a two-dimensional matrix, each element of the 2-D matrix representing a weight. The weights in filter 410 may be designed or trained to detect or extract certain features from the spatial distribution of pixel values in the image. The extracted features may or may not be meaningful to a human eye. As discussed above, different filters may be used to detect or extract different features from the input pixel array. For example, different filters may be used to detect edges in an image, or to sharpen or blur an image. Filter 410 may have R rows (height) and S columns (width), and may typically be smaller than input pixel array 420, which may have a height of H pixels and a width of W pixels. Each weight in filter 410 may be mapped to a pixel in a region having R rows and S columns in input pixel array 420. For example, as shown in FIG. 4A, a convolution layer (e.g., first convolution layer 315 or second convolution layer 335) or a processing node of the convolution layer may receive pixel values for a region 422 (including R×S pixels) of input pixel array 420, perform element-wise multiplications between corresponding elements in filter 410 and region 422, and sum the products of the element-wise multiplications to generate a convolution output value 432. In other words, convolution output value 432 may be the sum of multiplication results between each weight in filter 410 and each corresponding pixel in region 422 according to $$\sum_{i=0}^{n} x_i w_i,$$

that is, a dot-product between a matrix represented by filter 410 and a matrix representing pixel values of region 422.

Similarly, as shown in FIG. 4B, the convolution layer (e.g., another processing node of the convolution layer) may receive pixel values for a region 424 (including R×S pixels) of input pixel array 420, perform element-wise multiplications between corresponding elements in filter 410 and region 424, and sum the products of the element-wise multiplications to generate a convolution output value 434. As shown in FIG. 4B, the convolution operations can be performed in a sliding-window fashion in a pre-determined stride D. For example, in the example shown in FIG. 4B, region 424 may be at a distance D (in terms of pixels) from region 422, and the next region for the next convolution operation may be situated at the same distance D from region 424. The stride D may be smaller or greater than the width S of filter 410.

The outputs of the convolution operations may form a convolution output matrix 430 with a height of E rows and a width of F columns. As described above, matrix 430 may be referred to as a feature map. The dimensions of matrix 430 may be smaller than input pixel array 420 and may be determined based on the dimensions of input pixel array 420, dimensions of filter 410, and the stride D. For example, if stride D is equal to one pixel in both horizontal and vertical directions, E may be equal to H–R+1, and F may be equal to W–S+1. In some implementations, each convolution output (e.g., output value 432 or 434) in FIGS. 4A and 4B may correspond to the output of a processing node of the convolution layer. In some implementations, the convolution operations may be performed between multiple input pixel arrays (or input feature maps) and/or multiple filters.

The convolution using one filter over an input pixel array may be used to produce one feature map, and the convolution using another filter over the same input pixel array may generate a different feature map. In practice, a CNN may learn the weights of the filters on its own during the training process based on some user specified parameters (which may be referred to as hyperparameters) before the training process, such as the number of filters, the filter size, the architecture of the network, etc. The more number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters used for the convolution operation. In CNN 300 shown in FIG. 3, three distinct filters are used in first convolution layer 315 to perform convolution operations on the input image, thus producing three different output matrices (or feature maps) 320. Stride is the number of pixels by which the filter matrix is slid over the input pixel array. For example, when the stride is 1, the filter matrix is moved by one pixel at a time. When the stride is 2, the filter matrix is moved by 2 pixels at a time. Having a larger stride may produce smaller feature maps. In some implementations, the input matrix may be padded with zeros around the border so that the filter may be applied to bordering elements of the input pixel array. Zero padding may allow the control of the size of the feature maps.

As shown in FIG. 3, an additional non-linear operation using an activation function (e.g., ReLU) may be used after every convolution operation. As described above, ReLU is an element wise operation that replaces all negative pixel values in the feature map by zero. The purpose of ReLU is to introduce non-linearity in the CNN. Other non-linear functions, such as tanh or sigmoid, can also be used, but ReLU has been found to perform better in most situations.

Spatial pooling (also called subsampling or down-sampling) may reduce the dimensions of each feature map, while retaining the most important information. In particular, pooling may make the feature dimensions smaller and more manageable, and reduce the number of parameters and computations in the network. Pooling may also make the network invariant to small transformations, distortions, and translations in the input image such that a small distortion in the input image may not change the output of pooling as the maximum or average value in a local neighborhood is used. Thus, pooling may help to achieve an equivariant representation of the input image such that objects in an image may be detected no matter where they are located. Spatial pooling may be performed in different ways, such as max pooling, average pooling, sum pooling, etc. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

FIGS. 5A-5E illustrate example convolution, non-linear activation, and pooling operations performed on example input pixel data. The input pixel data may represent, for example, a digital image, a channel of a digital image, or a feature map generated by a previous layer in a convolutional neural network. FIG. 5A illustrates an example input matrix 510 that includes the example input pixel data. Input matrix 510 may include a 6×6 pixel array, where each element of the pixel array may include a real number, such as an integer number or a floating point number. FIG. 5B illustrates an example filter 520. Filter 520 may include a 3×3 matrix, where each element of the matrix represents a weight of the filter. Filter 520 may be used to extract certain features from input matrix 510. For example, the example filter 520 shown in FIG. 5B may be a filter for detecting edges in an image.

Input matrix 510 and filter 520 may be convoluted to generate an output matrix 530 as shown in FIG. 5C. Each element in output matrix 530 may be the sum of element-wise multiplications (i.e., dot-product) between corresponding elements in filter 520 and an overlapping region 512 of input matrix 510, as a window having the same dimensions as filter 520 (e.g., 3×3) slides over input matrix 510 with a certain stride (e.g., 1 element horizontally and/or vertically) in each step. For example, the value of element 532 in row 1 and column 3 of output matrix 530 may be the dot-product between the matrix representing filter 520 and a matrix representing region 512 of input matrix 510, where 2×0+1×1+0×0+5×1+3×(−4)+2×1+2×0+1×1+1×0=1+5−12+2+1=−3. Similarly, the value of element 534 in row 4 and column 1 of output matrix 530 may be the dot-product between the matrix representing filter 520 and a matrix representing region 514 of input matrix 510, where 0×0+2×1+1×0+0×1+0×(−4)+1×1+5×0+3×1+2×0=2+1+3=6. For input matrix 510 with a 6×6 pixel array and filter 520 represented by a 3×3 matrix, output matrix 530 may be a 4×4 matrix when the stride used is one element or pixel.

A non-linear activation function (e.g., ReLU, sigmoid, tanh, etc.) may then be applied to output matrix 530 to generate a matrix 540 as shown in FIG. 5D. In the example shown in FIG. 5D, the ReLU function is used, and thus all negative values in output matrix 530 are replaced by 0s in matrix 540. A pooling operation (e.g., a max, average, or sum pooling operation) may be applied to matrix 540 to sub-sample or down-sample data in matrix 540. In the example shown in FIGS. 5D and 5E, a max pooling operation may be applied to matrix 540, where the 4×4 matrix 540 may be divided into four 2×2 regions 542, 544, 546, and 548. The maximum value of each region may be selected as a subsample representing each region. For example, a maximum value of 9 is selected from region 542, a maximum value of 2 is selected from region 544, a maximum value of 5 is selected from region 546, and a maximum value of 6 is selected from region 548. Thus, a feature map 550 with four elements 9, 2, 6, and 5 may be generated from the 6×6 input matrix 510 after the convolution, non-linear activation, and pooling operations.

Referring back to FIG. 3, CNN 300 may include two sets of convolution, ReLU, and pooling layers, where the second convolution layer 335 may perform convolution operations on the output of pooling layer 325 using six filters to produce a total of six feature maps. ReLU may then be applied individually on all of these six feature maps. Next, max pooling operation may be performed on each of the six rectified feature maps. These convolution, ReLU, and pooling layers may, in combination, extract useful features from an image, introduce non-linearity in the network, and reduce feature dimension, while making the features equivariant to scale and translation. The output matrices 350 of pooling layer 345 represent high-level features of the input image, and may be used as an input to fully-connected layer 360.

Fully-connected layer 360 may be a multi-layer perceptron. As described above, in the fully-connected layer, every node in a layer is connected to every node on the adjacent layer(s). Fully-connected layer 360 may use the high-level features of the input image represented by output matrices 350 to classify the input image into various classes based on the training dataset. In addition to image classification, the fully-connected layer may also be used as a low-cost way to learn the non-linear combination functions of these high-level features. The features from the convolutional and pooling layers may be good for the classification task, but non-linear combinations of those features might be even better.

Fully-connected layer 360 may use a Softmax activation function on the output layer. The Softmax function takes a vector of real-valued scores and transforms it to a vector with values (probabilities) between zero and one that sum to one. Thus, the sum of the output values (probabilities) from the fully-connected layer is 1. In some embodiments, other classifiers, such as a support vector machine (SVM) classifier, can also be used.

In the example shown in FIG. 3, two sets of convolution and pooling layers are used. It is noted that these operations can be repeated any number of times in a single CNN. In addition, a pooling layer may not be used after every convolutional layer. In some implementations, a CNN may perform multiple convolution and ReLU operations before performing a pooling operation.

The training process of a convolutional neural network, such as CNN 300, may be similar to the training process discussed above with respect to the feedforward neural network described in FIG. 2. First, all parameters and weights (including the weights in the filters and weights for the fully-connected layer) may be initialized with random values. Second, the convolutional neural network may take a training sample (e.g., a training image) as input, perform the forward propagation steps (including convolution, non-linear activation, and pooling operations, along with the forward propagation operations in the fully-connected layer), and determine the output probability for each possible class. Since the parameters of the convolutional neural network, such as the weights, are randomly assigned for the training example, the output probabilities may also be random.

The total error at the output layer (summation over all possible classes) may be calculated by summing the probability errors for all possible classes. For example, the total error may be calculated based on:

$$\text{Total Error} = \tfrac{1}{2}\Sigma(\text{target probability} - \text{output probability})^2,$$

where the target probabilities may include a "1" corresponding to the actual class of the object in the image, and "0s" corresponding to other classes. Techniques such as the backpropagation techniques described above may then be used to calculate the gradients of the error with respect to parameters and weights to be trained in the network and use the gradient descent to update parameters and weights to be trained in the network to minimize the output error. The weights may be adjusted according to their contribution to the total error. When the same training sample is input again, the output probabilities might be closer to the target probabilities, which indicates that the network has learned to classify this particular image. As described above, some parameters of the convolutional neural network, such as the number of filters, filter sizes, architecture of the network, etc., may have been pre-selected and remain unchanged during the training process. The above-described training process may be repeated for all training samples in the training dataset.

At the end of the training process, all weights and parameters of the CNN may have been optimized to correctly classify the training samples from the training dataset. When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

There may be many variations and improvements to CNN 300 described above, such as AlexNet (2012), ZFNet (short for Zeiler & Fergus Net) (2013), GoogLeNet (2014), VGG-Net (which shows that the performance of the network may depend on the depth (number of layers) of the network) (2014), Residual Network (ResNets) (2015), and Densely Connected Convolutional Network (DenseNet) (2016).

In the feedforward neural networks described above, all samples are considered to be independent. In a recurrent neural network (RNN), the same operations are performed on every element in a sequence, where the output for one input element may depend on the outputs for previous input elements. One of the most commonly used type of RNNs is the long short-term memory (LSTM) network, which may include an input layer, one or more LSTM layers, and a fully-connected layer. As in CNNs, the fully-connected layer in an RNN may also include one or more layers and may perform classification functions using, for example, a Softmax activation function.

The training process and inference process described above may be performed on hardware, software, or a combination of hardware and software. However, training an artificial neural network or using the trained artificial neural network for inference generally requires significant amount of computation power to perform, for example, the matrix multiplications or convolutions. Thus, specialized hardware circuits, such as graphic processing units (GPUs), tensor processing units (TPUs), neural network processing units (NPUs), FPGAs, ASICs, or other highly parallel processing circuits may be used for training and/or inference. Training and inference may be performed on, for example, a single computing device or in a distributed computing system, such as in a data center.

Figure 6:
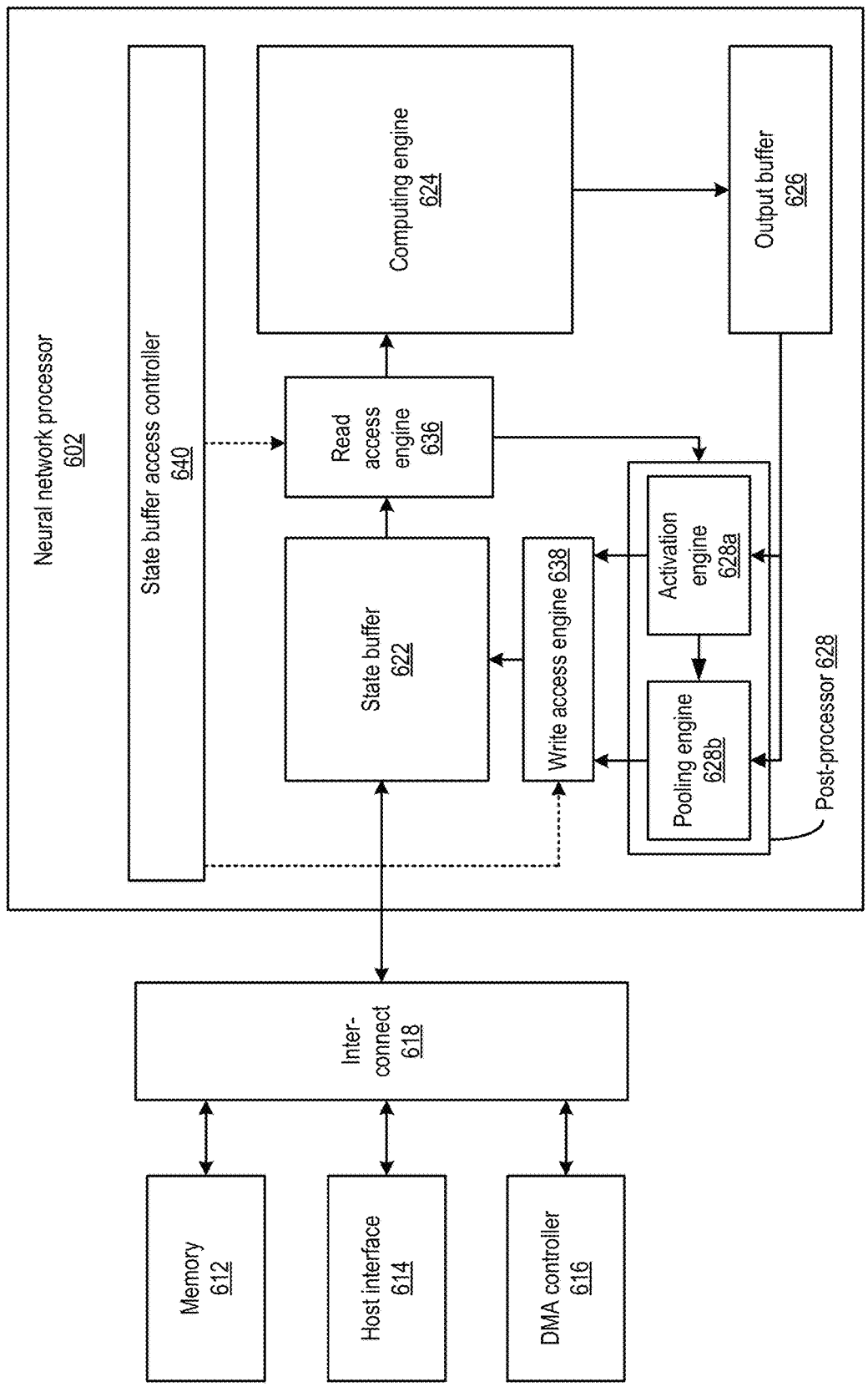
FIG. 6 illustrates an example apparatus for an example artificial neural network.

FIG. 6 illustrates an example apparatus 600 for an example artificial neural network. Apparatus 600 may be part of a computer system, such as a data center server. In some embodiments, apparatus 600 may be part of a multi-tenant compute service system (e.g., a cloud) and may communicate with a host device (not shown in FIG. 6) to provide computing and memory resources for a computing service. Apparatus 600 may include a neural network processor 602 coupled to memory 612, a direct memory access (DMA) controller 616, and a host interface 614 via an interconnect 618. Neural network processor 602 may provide computing resources to support inference using a trained neural network. In some implementations, neural network processor 602 may be implemented using one or more semiconductor devices. The one or more semiconductor devices may include circuits for implementing an artificial neural network. More detail of the operation of neural network processor 602 is described below.

Memory 612 may be configured to store the instructions, input data (e.g., pixel data of images), and the weights (e.g., the filter data) or other parameters of the trained neural network received from, for example, the host device. Memory 612 may also be used to store the output of neural network processor 602 (e.g., one or more image recognition decisions on the input images) or some intermediary data. Memory 612 may include any suitable memory, such as dynamic random access memory (DRAM), synchronous DRAM (SDRAM), double data rate DRAM (DDR DRAM), storage class memory (SCM), flash memory devices, etc.

DMA controller 616 may be configured to perform DMA operations to transfer data between neural network processor 602 and the host device. For example, as discussed above, the host device may store the instructions, input data, the weights, and other parameters of the neural network at memory 612. The host device may provide the memory addresses for the stored instructions, data, weights, and other parameters of the neural network to neural network processor 602 (e.g., in the form of memory descriptors). Neural network processor 602 may then obtain the stored instructions, data, weights, or other parameters of the neural network based on the memory addresses provided by the host device. Neural network processor 602 may also store the results of computations (e.g., one or more image recognition decisions or intermediary data) at memory 612, and provide the memory addresses for the stored results to the host device.

Host interface 614 may enable communications between the host device and neural network processor 602. For example, host interface 614 may be configured to transmit the memory descriptors including the memory addresses of the stored data (e.g., input data, weights, results of computations, etc.) between the host device and neural network processor 602. Host interface 614 may include, for example, a peripheral component interconnect express (PCIe) interface or any suitable interface for communicating with the host device.

Neural network processor 602 may provide the computing resources to support the neural network computations for inference, such as image classification. In the example shown in FIG. 6, neural network processor 602 may include an integrated circuit, such as a system-on-chip (SoC), FPGA, or ASIC. Neural network processor 602 may include a number of circuit components, such as a state buffer 622, a computing engine 624, an output buffer 626, and a post-processor 628. In addition, neural network processor 602 may also include a read access engine 636 and a write access engine 638 to provide computing engine 642 and post-processor 628 with read and write access to state buffer 622 as discussed in detail below.

State buffer 622 may be configured to provide caching of data used for computations at computing engine 624. The data cached at state buffer 622 may include, for example, the input data and weights obtained from memory 612, output data from computing engine 624, and/or output data from post-processor 628. The caching may reduce the effect of memory access bottleneck (e.g., caused by the latencies at memory 612, DMA controller 616, interconnect 618, etc.) on the performance of computing engine 624. State buffer 622 may be an on-chip memory device and may include, for example, static random access memory (SRAM). In some embodiments, state buffer 622 may be partitioned based on the organization of computing engine 624. For example, state buffer 622 may include multiple SRAM banks, where each bank may be configured to store input data and weights for a row of computing engine 624.

Computing engine 624 may include an array of processing elements (PEs) configured to perform one or more arithmetic operations (e.g., vector multiplication) for neural network computations. In some implementations, computing engine 624 may be a matrix multiply unit that may be used for matrix convolution and/or matrix multiplication, and thus may be used to implement a convolution layer or a fully-connected layer. For example, in some implementations, computing engine 624 may include a systolic array that includes a two-dimensional array of processing elements arranged in rows and columns.

Figure 7:
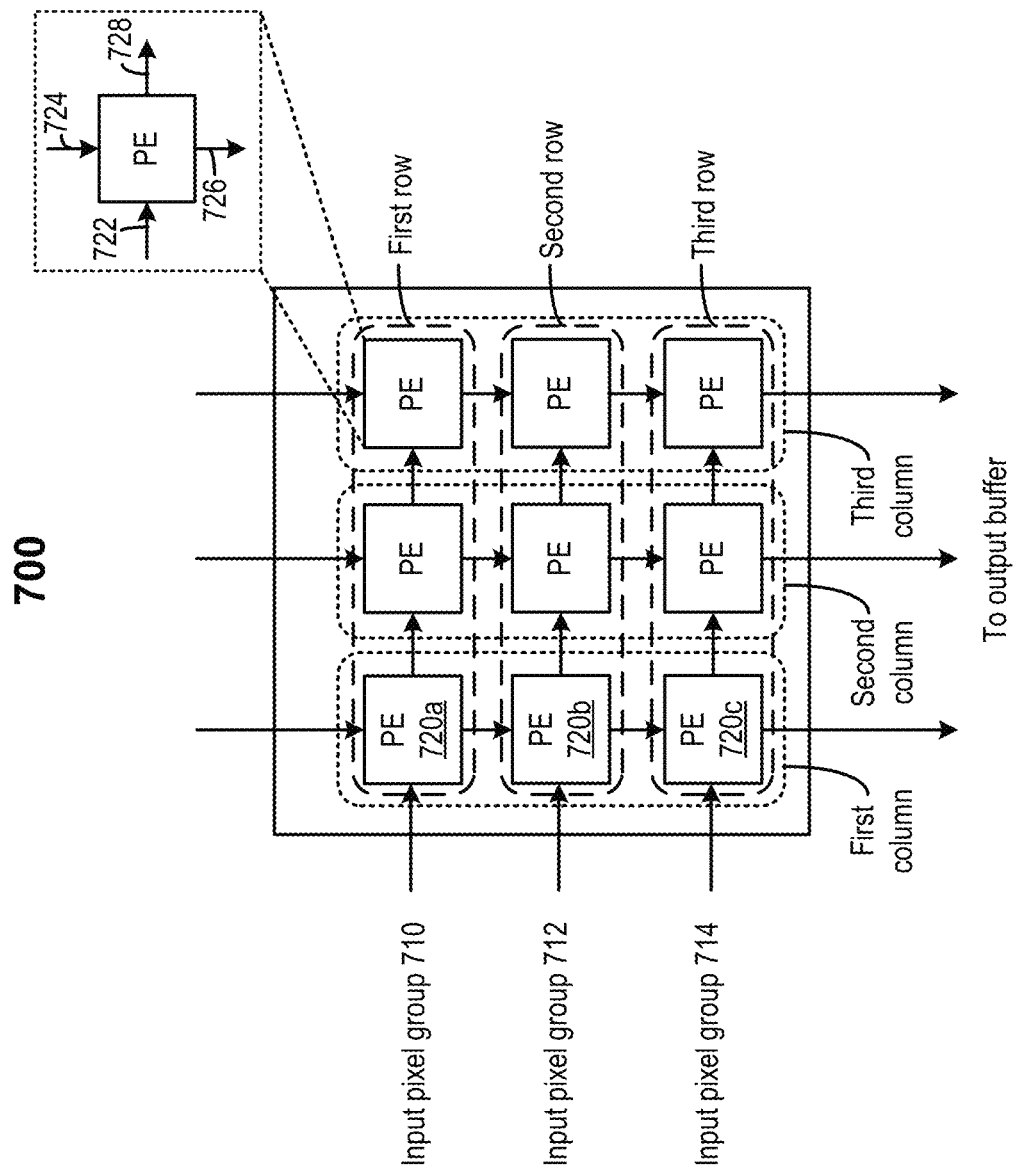
FIG. 7 illustrates a simplified example computing engine including an array of processing elements.

FIG. 7 illustrates a simplified example computing engine 700 including an array of processing elements 720. Computing engine 700 may be a simplified example of computing engine 624. In the example shown in FIG. 7, computing engine 700 may include a 3×3 array of PEs with three PEs in each row and three PEs in each column. Each PE may include a row input bus 722, a column input bus 724, a column output bus 726, and a row output bus 728. A PE may receive inputs from a preceding PE (on the left) in the same row (or from external circuitry) via row input bus 722. The PE may also receive inputs from a preceding PE (on top) in the same column (or from external circuitry) via column input bus 724. The PE may perform arithmetic operations (e.g., multiply and accumulate (MAC)) based on the inputs, and transmit the result of the arithmetic operations to a subsequent (lower) PE in the same column (or to external circuitry) via column output bus 726. The PE may also forward the inputs to a subsequent PE (to the right) in the same row, via row output bus 728.

Each row of computing engine 700 may process one input data set comprising multiple input data elements, whereas each column of computing engine 700 may generate a weighted sum of input data elements from different input data sets. For example, when computing engine 700 is to process three input pixel groups 710, 712, and 714, a first row may receive elements of pixel group 710, a second row may receive elements of input pixel group 712, and a third row may receive elements of input pixel group 714. Each PE may include a multiplier and an adder that would handle one input data element at a time. A PE may receive one input data element and a weight (e.g., from row input bus 722) and generate, using the multiplier, a multiplication product to represent a weighted input data element. The weight may be an element of a convolution kernel (i.e., filter) or a weight of a connection between nodes on two layers of a fully-connected layer. In addition, the PE may also receive a partial weighted sum from the preceding PE in the same column (e.g., from column input bus 724). The partial weighted sum represents the weighted sum of input data elements of input data sets received by PEs on each row above the PE. The PE may add the weighted input data element to the partial weighted sum, and pass the updated partial weighted sum to the PE below (e.g., through column output bus 726), and the PEs at the bottom row may generate a weighted sum of input data elements received by PEs on all rows.

The operations of each PE of computing engine 700 may be synchronized to a continuous clock signal to improve the interoperability between computing engine 700 and other components of the neural network processor (e.g., neural network processor 602). Each PE may also include sequential logic circuitries (e.g., registers, state machines, etc.) to store input data, weights, and output data for the adder and multiplier circuitry, and to synchronize the flow of the data into and out of the circuitry. The sequential logic circuitry of each PE can be clocked by either the same continuous clock signal or a replica of the clock signal, such that data may be shifted into and/or out of the PE sequentially during the clock cycles. For example, in a first clock cycle, a PE 720b of the second row may receive a first input data element of pixel group 712 as well as a partial sum comprising weighted first input data element of pixel group 710 from PE 720a of the first row. Within the first clock cycle, a PE 720b may multiply the input data element with a weight, add the multiplication product to the partial sum to generate an updated partial sum, and store the updated partial sum in an internal register. In the second clock cycle, PE 720b may forward the updated partial sum to a PE 720c on the third row below, which may perform the multiplication and accumulation to generate an updated partial sum. In the third clock cycle, PE 720c may output the partial sum.

In some implementations, each column of computing engine 700 may correspond to a different processing node of a neural network layer, and may apply a different set of weights {$w_i$} to generate a different weighted sum $$y = \sum_{i=0}^{n} x_i w_i$$

for each input dataset {$x_i$}.

Referring back to FIG. 6, post-processor 628 can be configured to perform post-processing on the outputs of computing engine 624 (which may act as a neural network layer, such as a convolution layer or fully-connected layer) that may be stored in output buffer 626 to generate final outputs for the neural network layer. In the example shown in FIG. 6, post-processor 628 may include an activation engine 628a and a pooling engine 628b. Activation engine 628a may perform one or more activation (non-linear) functions, such as tanh, sigmoid, ReLu, etc., on the outputs of a convolution layer to generate the output data, and store the output data at state buffer 622. In some implementations, activation engine 628a may include one or more lookup tables (e.g., in the form of multiplexer circuits) to implement the activation functions. Pooling engine 628b can perform, for example, maximum pooling, average pooling, etc., on the outputs of a convolution layer or activation engine 628a to generate subsamples, and store the subsamples at state buffer 622. Pooling engine 628b and/or activation engine 628a may also be controlled to be skipped for certain convolution layers. For example, as discussed above, a CNN may perform multiple convolution and ReLU operations before performing a pooling operation.

Both pooling engine 628b and activation engine 628a may be configured to retrieve data (e.g., from output buffer 626 or state buffer 622) to perform the post-processing (e.g., pooling and activation function processing) in batches. A post-processing batch can start as soon as output buffer 626 generates a set of new convolution output array elements. Compared with the case where the post-processing is not started until each element of the convolution output array is generated, batch processing can speed up the post-processing and reduce the storage space requirements at output buffer 626 and post-processor 628 to support the post-processing operations.

Activation engine 628a can also perform the activation function processing in batches. For example, after new subsamples (or the four new elements) are stored at output buffer 626 or state buffer 622, activation engine 628a can retrieve the subsamples (or the four new elements) from output buffer 626 or state buffer 622 and apply the activation function processing to generate the final output data elements. The final output data elements can be stored as the input data for pooling engine 628b or the next neural network layer at state buffer 622.

In some implementations, post-processor 628 may also include a Softmax engine (not shown in FIG. 6) that can perform a Softmax function on the output of the fully-connected layer. As described above, the Softmax engine may take a vector of real-valued scores from a fully-connected layer and map the vector of real-valued scores to a vector of probability values between zero and one that sum to one.

Read access engine 636 can provide read access to state buffer 622 for a read access requester device including, for example, computing engine 624 and post-processor 628. Moreover, write access engine 638 can provide write access to state buffer 622 for a write access requester device including, for example, post-processor 628. Each of read access engine 636 and write access engine 638 can convert a sequential series of access operations (e.g., multiple read or write operations across multiple clock cycles) to a single access operation to reduce power and reduce wait latency, as discussed above. Each of read access engine 636 and write access engine 638 may be organized based on state buffer 622. For example, each of read access engine 636 and write access engine 638 may include multiple sub-engines corresponding to multiple SRAM banks of state buffer 622, with each sub-engine providing access to the corresponding SRAM bank. A sub-engine of read access engine 636 can convert a sequential series of read access operations to the corresponding SRAM bank for multiple data elements (e.g., by a row of computing engine 624 or by post-processor 628) to a single read access for the multiple data elements. A sub-engine of write access engine 638 can also convert a sequential series of write accesses for storing multiple data elements at the corresponding SRAM bank (e.g., by post-processor 628) to a single write access for the multiple data elements. Moreover, a sub-engine, coupled with a SRAM bank comprising single-port SRAM devices, can create a memory with multiple read and write access ports.

In general, the number of nodes in the last layer of the fully-connected layer in a CNN or LSTM network may be directly proportional to the label size (i.e., the number target classes of objects to be classified). The larger the label size, the larger the number of nodes in the last layer. For example, to recognize 200,000 different objects, the last layer of the fully-connected layer may include 200,000 nodes, each node corresponding to one unique object.

As described above, in the fully-connected layer, every node on an input layer is connected to all nodes on an output layer, and every node on the output layer is connected to all nodes on the input layer. As a result, the number of weights for the connections between two FC layers may be equal to the product of the number of nodes on the input layer and the number of nodes on the output layer.

Figure 8:
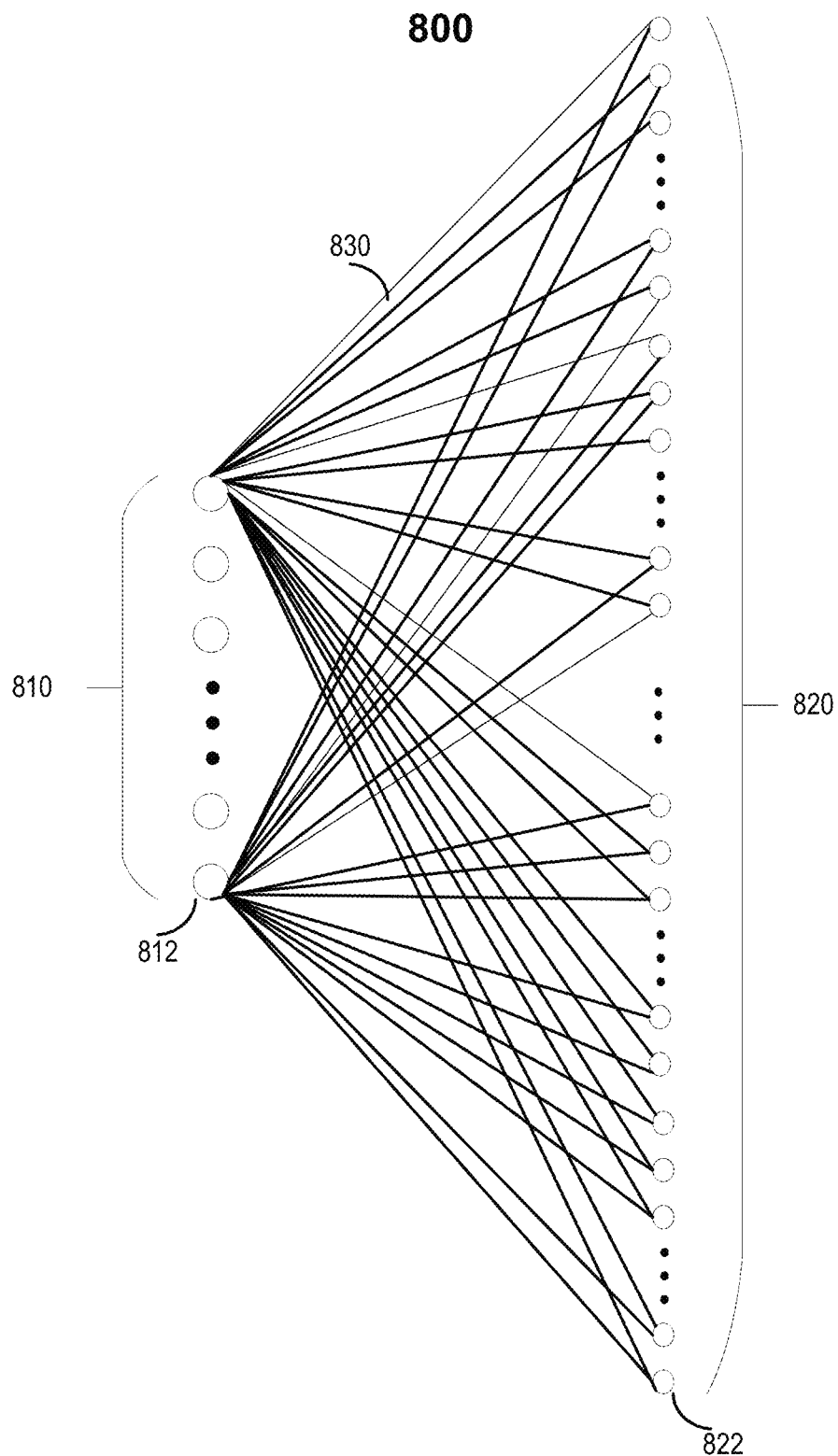
FIG. 8 illustrates an example large fully-connected layer.

FIG. 8 illustrates an example large fully-connected layer 800. Fully-connected layer 800 may include an input layer 810, which may be an input layer (e.g., input layer 370 of FIG. 3) or a hidden layer (e.g., hidden layer 380). Input layer 810 may include M network nodes 812. Fully-connected layer 800 may also include an output layer 820, which may be a last layer of the fully-connected layer, such as output layer 390 of FIG. 3. Output layer 820 may include N network nodes 822. The number of network nodes 822 in output layer 820 may be equal to the number of target classes to be classified as, where each network node 822 may correspond to one target class. Every network node 812 on input layer 810 is connected to all network nodes 822 on output layer 820 through N connections 830, and every network node 822 on output layer 820 is connected to all network nodes on input layer 810 though M connections 830. Thus, the total number of connections 830 may be M×N.

In one specific example, there may be 1,000 inputs on input layer 810. Thus, input layer 810 may include 1,000 network nodes 812 (M=1,000). The number of different objects to be classified by fully-connect layer 800 may be 200,000. Thus, output layer 820 may include 200,000 network nodes 822 (N=200,000). As such, there may be 1,000×

200,000 weights representing the M×N connections 830 between input layer 810 and output layer 820. If each weight is represented by a FP32 (4-byte) number, 800 Mbytes of memory space would be used to store the weights and 200 million multiplications would be performed, which imposes large memory storage and bandwidth requirements on the underlying hardware for implementing the fully-connected layer.

Thus, in many cases, the required storage space may be much larger than the available on-chip SRAM memory. As such, the weights and/or input data may need to be stored on a larger but slower memory device, and may be read from or written to the memory device a portion at a time. Therefore, in many cases, memory access (e.g., reading weights and partial sum and updating partial sum) may become the bottleneck. As a result, for many artificial neural networks, the training process may take hours, days, or months. The inference (in particular, inference on device) may also take significant amount of time due to the hardware limitation (e.g., memory, bandwidth, processors) on the device, which may limit the application of neural networks for some real-time tasks, such as advanced driver-assistance systems (ADAS) and artificial reality (e.g., virtual reality or augmented reality).

Various model compression techniques have been used to reduce the complexity and requirements on the underlying hardware or to improve the speed of training and/or reference. For example, a deep neural network may be pruned to make it smaller and faster. In some examples, the neurons or nodes may be pruned, for example, to remove lower ranking nodes based on the ranking of the nodes according to the contributions of these nodes. In some examples, the weights may be pruned to drop weights below a certain threshold to make the matrix sparse. However, weight pruning may not reduce the memory space requirement as the "0" weights may occupy the same memory space (e.g., 4 bytes for each weight). In addition, these model compression techniques may increase the error of the network, and thus may not be suitable for some applications.

According to some embodiments, rather than classifying an object as one class among all possible target classes in one step at the last layer of the fully-connected layer, the possible target classes may be divided into multiple (e.g., K) smaller groups, and, in each classification step, an object to be classified may be classified as one target class in a smaller group. If the first classification step fails to confidently classify the object as one target class in a first group, a second classification step may be performed to try to confidently classify the object as one target class in a second group. Additional classification steps may be performed until the object can be confidently classified as a target class. Thus, the number of weights used in each classification step may be reduce by a factor of K. As such, a device with limited memory space and computation power may be able to handle the classification process.

In addition, the target classes may be divided based on certain criteria to reduce the average number of classification steps (and time) needed to classify an object. In some implementations, the target classes may be ranked based on popularity or probability, and may then be divided into the K smaller groups based on the ranking. For example, for voice recognition, translation, or word (or character, such as Chinese characters) recognition, the ranking may be based on the relative frequency that a word may be used. This may increase the chance that the object may be confidently classified in the first classification step, and thus may reduce the average number of classifications (and time) needed to classify an object. In some embodiments, the target classes may be divided into multiple categories, where target classes in each category may share some comment features. In the first classification step, the object to be classified may be classified into one category of the multiple categories, and, in a second classification step, the object may be classified as one of the target classes in the category classified in the first step.

Furthermore, one new class may be added to each smaller target class group in order to determine whether the object to be classified belongs to one of the target classes in the smaller group or not and to avoid overconfidently classifying the object. This new class may be a class indicating that the class of the object is "unknown," "none of the above," or "not in this group" based on the current classification step, and thus may need to be identified from another target class group.

According to certain embodiments, a fully-connected layer in an artificial neural network configured to implement the method discussed above may include an input layer and an output layer (e.g., the last layer), where the nodes on the output layer may be grouped into K groups (where K is greater than one) rather than a large group that includes all nodes. The input layer may include a plurality of nodes each connected to all nodes in each of the K groups, and each node in every group of the K groups is connected to all nodes on the input layer. Thus, the input layer and each group of the K groups may form a fully-connected subnetwork, and the fully-connected layer may include K fully-connected subnetworks. Each of the fully-connected subnetworks may be trained independently and may be used to classify an object in a classification step. In this way, the number of weights used and the number of multiplication performed in each classification step may be reduced by a factor of K. Thus, both the training and the inference can be performed faster. As described above, the nodes on the last fully-connected layer may be arranged into the K groups according to certain criteria such that the nodes corresponding to more popular or more probable classes may be included in the groups that may be used in earlier stages of the classification process. This may help to reduce the average number of classification steps used to confidently classify an object.

Figure 9:
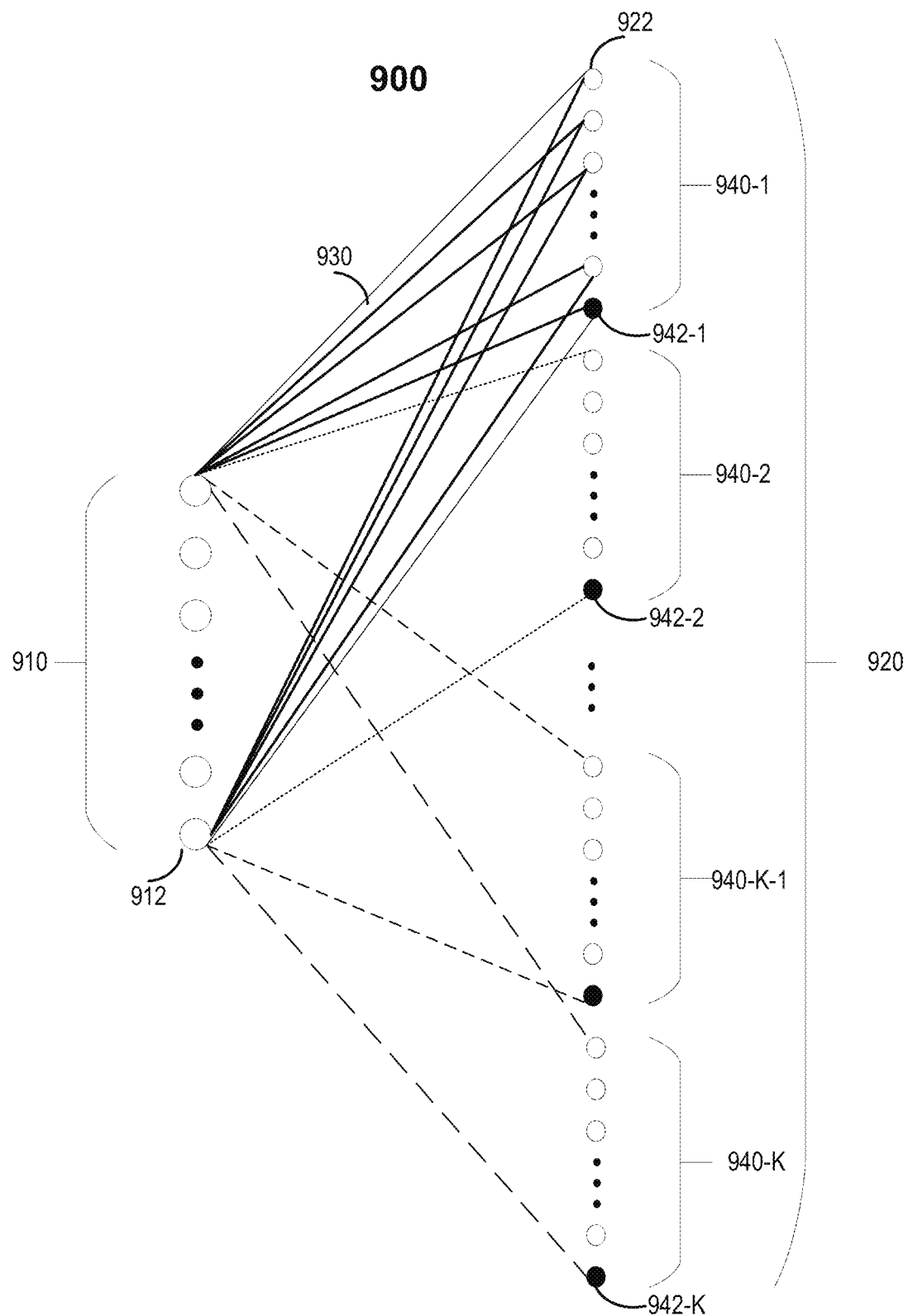
FIG. 9 illustrates a simplified fully-connected layer including multiple groups of nodes on an output layer of the fully-connected layer according to certain embodiments.

FIG. 9 illustrates a simplified fully-connected layer 900 including multiple groups of nodes on an output layer 920 (e.g., the last layer) of the fully-connected layer according to certain embodiments. Fully-connected layer 900 may be the last layer in a multi-layer perceptron, a convolutional neural network, or a recurrent neural network described above. Fully-connected layer 900 may include an input layer 910 and output layer 920. Input layer 910 may be an input layer (e.g., input layer 370 of FIG. 3) or a hidden layer (e.g., hidden layer 380). Input layer 910 may include M nodes 912. Output layer 920 may be a last layer of the fully-connected layer, such as output layer 390 of FIG. 3. Output layer 920 may include N nodes 922. The total number of nodes 922 on output layer 920 may be equal to or greater than the total number of target classes to be classified. Every network node 912 on input layer 910 is connected to all nodes 922 on output layer 920 through N connections 930, and every node 922 on output layer 920 is connected to all network nodes on input layer 910 though M connections 930. Thus, the total number of connections 930 may still be M×N as in fully-connected layer 800.

As shown in FIG. 9, the N nodes 922 on output layer 920 may be divided into K groups 940-1, 940-2, . . . , 940-K−1, and 940-K. In some embodiments, each of the K groups may include N/K nodes. Among the N/K nodes in each group, N/K−1 nodes may each correspond to a target class, and one node (942-1, 942-2, . . . , or 942-K) may correspond to an "I don't know" (IDK) class, which may indicate that an object to be classified would not be confidently classified into one of the N/K−1 target classes in the group. Thus, the total number of target classes that may be confidently classified by fully-connected layer 900 may be N-K. In some embodiments, there may be different numbers of nodes in different groups of the K groups. In some embodiments, nodes 922 on output layer 920 may be divided into the K groups based on, for example, the popularity or probability associated with each target class. For example, the N/K−1 nodes corresponding to N/K−1 target classes with the highest popularity or probability (e.g., target classes 1 to N/K−1) may be included in group 1 (940-1), the N/K−1 nodes corresponding to N/K−1 target classes with the next highest popularity or probability (e.g., target classes N/K to 2N/K−2) may be included in group 2 (940-2), and so on. Each of the K groups of nodes may form a respective fully-connected subnetwork with input layer 910. For example, group 940-1 and input layer 910 may form a first fully-connected subnetwork having M×N/K connections, group 940-2 and input layer 910 may form a second fully-connected subnetwork having M×N/K connections, and so on. In one specific example, input layer 910 may include 1,000 nodes 912 (M=1,000), and output layer 920 may include 200,000 nodes 922 (N=200,000) arranged in 200 groups (K=200), each group including 1,000 nodes 922.

The K fully-connected subnetworks may be trained individually in serial or in parallel. For example, to train the first fully-connected subnetwork, training samples corresponding to target classes other than target classes 1 to N/K−1 may be labeled as "IDK." Training samples labeled as classes 1 to N/K−1 and "IDK" may then be used to train the first fully-connected subnetwork to determine M×N/K weights for the M×N/K connections. Because only M×N/K weights, rather than M×N weights, are to be determined for the first fully-connected subnetwork, the training may be performed much faster and may require less memory space and/or computing power. To train the second fully-connected subnetwork, training samples corresponding to target classes other target classes 1 to 2N/K−2 (or target classes other than target classes N/K to 2N/K−2) may be relabeled as "IDK," and training samples labeled as target classes N-K to 2N/K−2 or "IDK" may be used to determine M×N/K weights for the M×N/K connections in the second fully-connected subnetwork. Other fully-connected subnetworks may be trained in a similar manner.

To classify an unknown object using fully-connected layer 900, the first fully-connected subnetwork may be used first, in combination with other preceding layers in the artificial neural network. The unknown object may be a physical item or a signal, such as an audio signal. The preceding layers may extract certain features from the input that represent the unknown object, such as a digital image of the unknown physical item or a digitized waveform of the signal. The extracted features may be fed to input layer 910, and the sum of products of the inputs on the M nodes 912 and the corresponding trained weights for the M connections 930 between nodes 912 and each node 922 in first group 940-1 may be calculated at each node 922 in group 940-1. Thus, M×N/K weights may be used and M×N/K multiplications may be performed for the classification using the first fully-connected subnetwork. As such, the classification using the first fully-connected subnetwork may use less memory space and/or computing power than classifying the unknown object using fully-connected layer 800.

For instance, in the specific example discussed above where M=1,000, N=200,000, and K=200, instead of reading 800 Mbyte of data for the 200 million weights (M×N) and performing 200 million multiplications and about 200 million summations when using fully-connected layer 800, 4 Mbytes of data for 1 million weights (M×N/K) may be used and 1 million multiplications and about 1 million summations may be performed when classifying the unknown object using the first fully-connected subnetwork that includes input layer 910 and nodes in first group 940-1 on output layer 920. Thus, the memory space (e.g., 4 MB) and/or computing power required for the classification using the first fully-connected subnetwork may be provided by most computing devices, including mobile devices, embedded devices, and devices using general purpose processors.

As described above, in some embodiments, a Softmax function may be applied to the outputs from the N/K nodes 922 in group 940-1 to determine the relative confidence level that the unknown object may belong to each of the N/K classes. The unknown object may be classified as one of the N/K classes based on the relative confidence level. If the unknown object is classified as one of target classes 1 to N/K−1, the classification process may end. If the unknown object is classified as class IDK, a second classification step may be performed using the second fully-connected subnetwork including nodes in group 940-2. If the unknown object is classified as one of target classes N/K to 2N/K−2, the classification process may end. If the unknown object is classified as class IDK, the classification process may continue until the unknown object is classified as one of the target classes, or as the IDK class using the last fully-connected subnetwork of the K fully-connected subnetworks that includes nodes in group 940-K.

In this way, a device with limited memory space or processing power may be able to classify an unknown object into one of a large number of target classes in one or more classification steps. Because the nodes on the output layer are grouped based on certain rankings, the probability of confidently classifying the unknown object with a smaller number of classification steps may be higher. The time used in each classification step may be shorter because less time may be used to read the weights from a memory device, perform the calculations, and save the results. In addition, in some embodiments, the weights for the first fully-connected subnetwork or the first few fully-connected subnetworks may be stored in a cache, and may not need to be reloaded each time an unknown object is to be classified. This may further reduce the average time used to classify an unknown object. Therefore, the classification process may be performed in real-time on devices with limited memory space and computing power for real time applications, such as artificial realities or autonomous driving.

In addition, using the "IDK" class in each classification step may help to prevent or reduce the probability of an overconfident classification when classifying using the Softmax function. For example, instead of selecting the target class corresponding to the highest confidence level (i.e., the best answer) as the classification result, an object may be classified as not belonging to any of the target classes in a group of target classes, or not belonging to any of the known target classes.

In some embodiments, fully-connected layer 900 may be implemented using a neural network processor, such as neural network processor 602 described above with respect to FIG. 6, or a computing engine, such as computing engine 624 or 700. In some embodiments, fully-connected layer 900 may be implemented using a general purpose processing unit and software code in, for example, python, R, C, C++, C#, MatLab, Octave, Java, etc.

Figure 10:
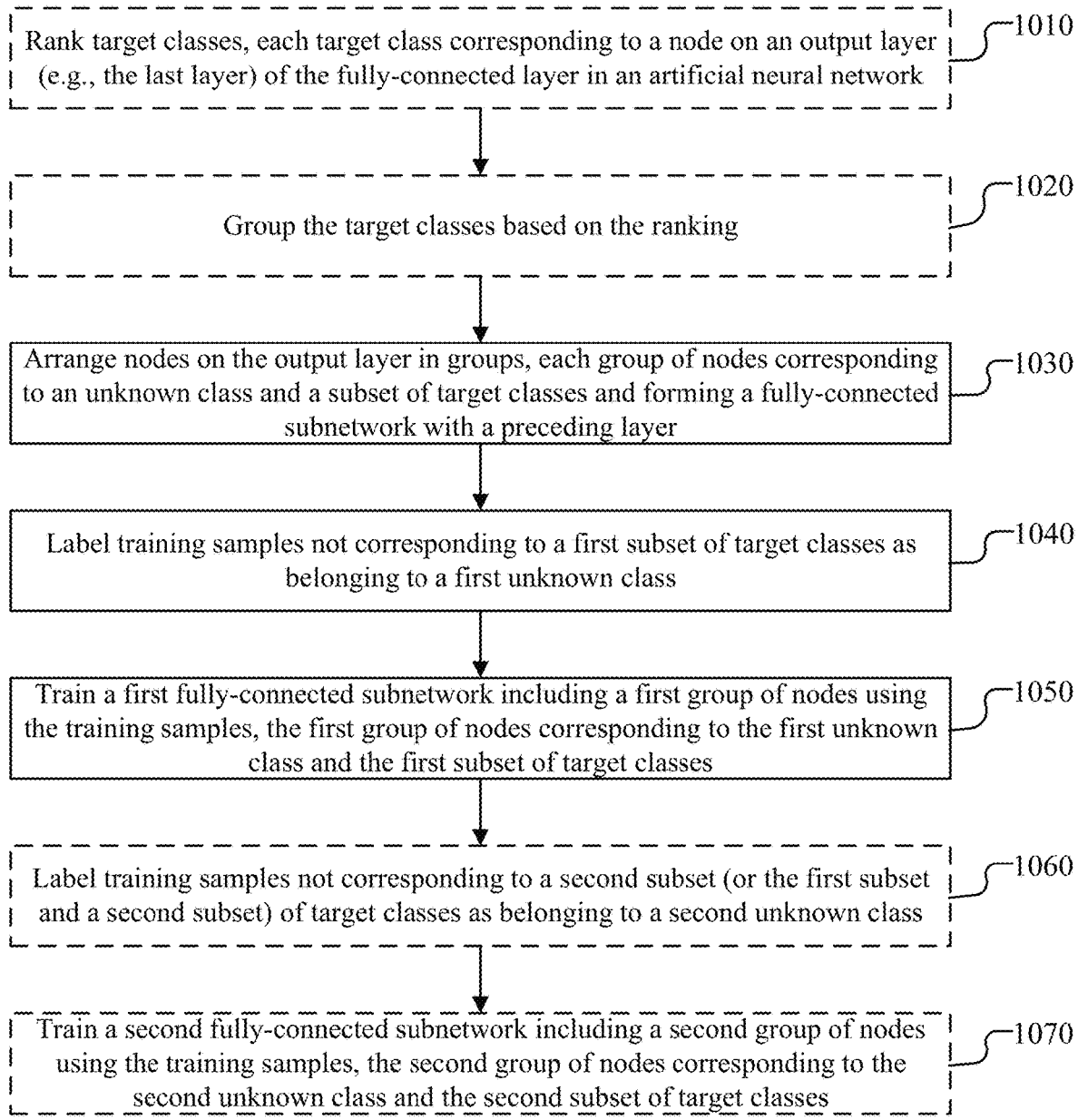
FIG. 10 is a simplified flow chart illustrating an example method of building a fully-connected layer in an artificial neural network for object classification according to certain embodiments.

FIG. 10 is a simplified flow chart 1000 illustrating an example method of building a fully-connected layer in an artificial neural network for object classification according to certain embodiments. The example method may be implemented using the systems described above, such as, for example, a GPU, a TPU, neural network processor 602, computing engine 624 or 700, or a general purpose computer with instruction code. The instruction code may be stored on a non-transitory storage medium (e.g., on a memory device). The method presented in FIG. 10 and described below is intended to be illustrative and non-limiting.

Optionally, at block 1010, target classes of an artificial neural network-based classifier may be ranked based on certain criteria, such as the popularity of each class or the probability that an object to be classified by the classifier may belong to each class of the target classes. As described above, the artificial neural network may include, for example, a multi-layer perceptron, a convolutional neural network, or a recurrent neural network. The object to be classified may be, for example, a physical item (e.g., an animal, a plant, a person, a character, etc.), an activity (e.g., a gesture, a facial expression, a motion, etc.), a signal (e.g., an audio signal representing a word, an electrical signal detected by a sensor, etc.), or any other object that may belong to one of multiple different classes according to certain classification standards. In some embodiments, there may be a large number of target classes, such as 1,000 or more. Each target class may correspond to a node on an output layer (e.g., the last layer) of the fully-connected layer of the artificial neural network, such as output layer 230 of FIG. 2, output layer 390 of FIG. 3, or output layer 920 of FIG. 9. Thus, the total number of nodes on the output layer of the fully-connected layer of the artificial neural network may be equal to or greater than the number of the target classes.

Optionally, at block 1020, the target classes may be grouped into K groups or subsets based on the ranking, where K may be greater than 2, greater than 10, greater than 100, or more. In some embodiments, the number of target classes in each of the K groups may be a same number. In some embodiments, the number of target classes in some groups may be different from the number of target classes in other groups.

At block 1030, the nodes on the output layer may be assigned among K groups, for example, based on the K groups or subsets of target classes determined at block 1020 and the correspondence between the nodes on the output layer and the target classes. Thus, a first group of nodes may correspond to a first group of target classes that have the highest rankings among all target classes, a second of a nodes may correspond to a second group of target classes, and so on. Each group of nodes may also include a node that corresponds to an unknown class, which may be dubbed "I don't know" (IDK) or other labels. As described above with respect to FIG. 9, the nodes in each group may form a fully-connected subnetwork (also referred to as a layer subnetwork) with a preceding layer, such as input layer 910 in FIG. 9. For example, the first group of nodes and the preceding layer may form a first fully-connected subnetwork, where each node in the preceding layer may be connected to all nodes in the first group of nodes, and each node in the first group of nodes may be connected to all nodes on the preceding layer. The second group of nodes and the preceding layer may form a second fully-connected subnetwork, and so on.

At block 1040, training samples used to train the artificial neural network may be relabeled. The training samples may include associated labels indicating the known target class each training sample may belong to. In some embodiments, training samples not corresponding to a first subset of target classes may be relabeled as belonging to a first unknown class, while the labels for other training samples may not be changed.

At block 1050, the artificial neural network, in particular, the first fully-connected subnetwork including a first group of nodes on the output layer of the fully-connected layer, may be trained using the training samples. The first group of nodes may correspond to the first unknown class and the first subset of target classes. As described above with respect to, for example, FIGS. 2 and 3, in some embodiments, the training may determine the weights for the connections between nodes on the preceding layer and the nodes in the first group of nodes. The determined weights may minimize the errors of the classifications of the training samples.

At block 1060, the training samples corresponding to neither the first subset nor the second subset (or not corresponding to the second subset) of target classes may be labeled as belonging to a second unknown class. In some embodiments, rather than relabeling the training samples not corresponding to the first and second subsets of target classes, the training samples used at block 1050 and corresponding to the second subset of target classes may be labeled with their original labels (e.g., labels corresponding to the second subset of target classes).

At block 1070, the artificial neural network, in particular, the second fully-connected subnetwork including the second group of nodes, may be trained using the training samples as described above with respect to, for example, FIGS. 2 and 3. The second group of nodes may correspond to the second unknown class and the second subset of target classes. In some embodiments, training samples corresponding to the first subset of target classes may not be used for training the second fully-connected subnetwork. In some embodiments, the training may determine the weights for the connections between nodes in the preceding layer and the nodes in the second group of nodes on the output layer. The determined weights may minimize the errors of the classifications of the training samples corresponding to the second subset of target classes and the training samples corresponding to the second unknown class.

In embodiments where K is greater than two, similar operations as the operations at blocks 1060 and 1070 may be performed to train the other fully-connected subnetworks formed by the other groups of nodes and the preceding layer using corresponding training samples. At the end of the training process, the weights for all K fully-connected subnetworks may be determined. The artificial neural network may then be implemented in hardware, software, or a combination of hardware and software on a computing device, such as a cloud computing device, a network-based computing device, a mobile device, an embedded device, etc., as described above. The implemented artificial neural network may then be used to classify an unknown object as one of the target classes, or, in some implementations, an unknown class, as described above with respect to FIG. 9 or described below with respect to FIG. 11.

Figure 11:
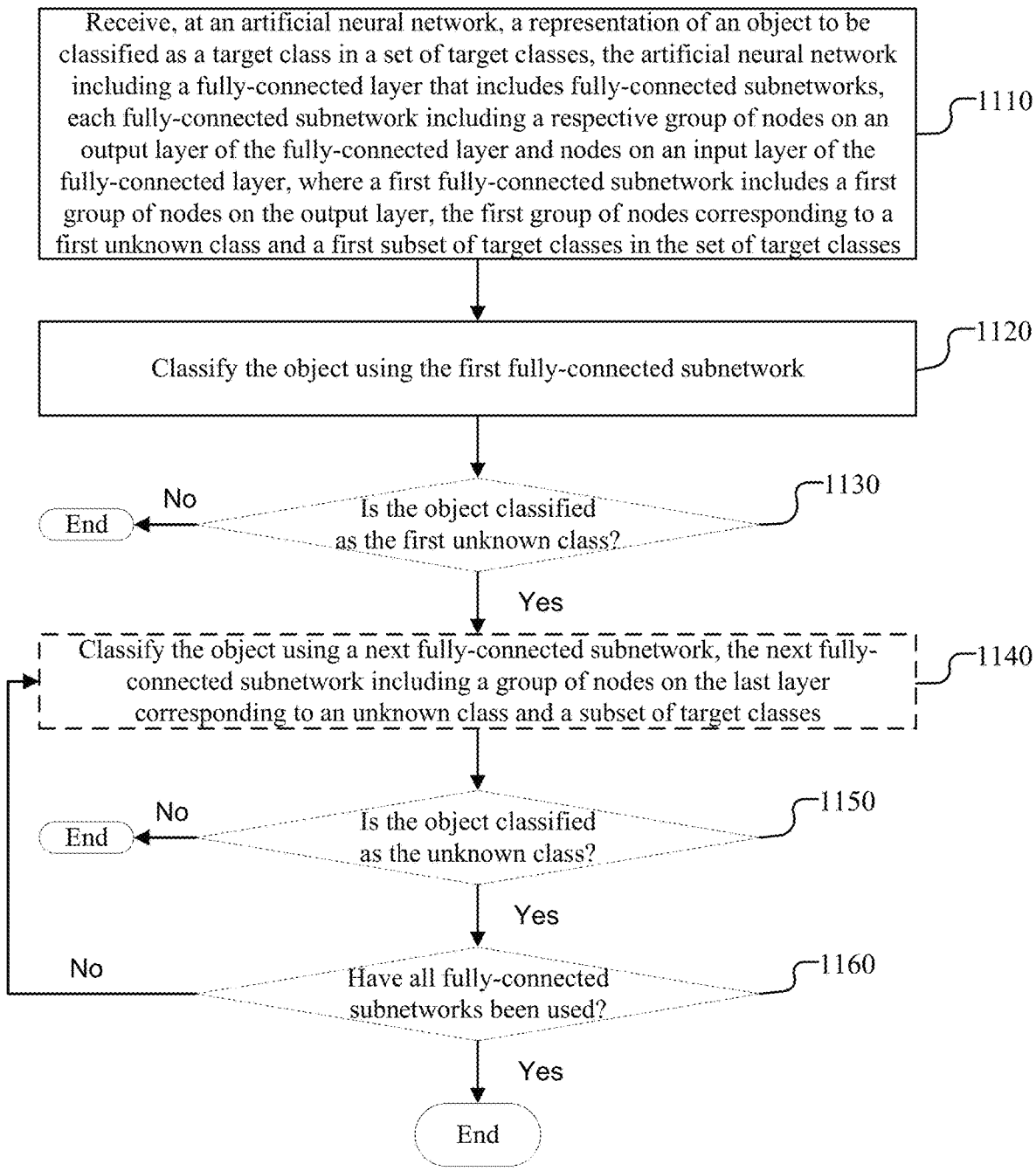
FIG. 11 is a simplified flow chart illustrating an example method of object classification according to certain embodiments.

FIG. 11 is a simplified flow chart 1100 illustrating an example method of object classification according to certain embodiments. The example method may be implemented using the systems described above, such as, for example, a GPU, a TPU, neural network processor 602, computing engine 624 or 700, a general purpose computer with instruction code, or a computing system as described below with respect to FIG. 12. The instruction code may be stored on a non-transitory storage medium (e.g., on a memory device). As described above, the systems configured to perform the method described in flow chart 1100 may implement a trained artificial neural network, such as one trained according to the embodiment described in FIG. 10. The method presented in FIG. 11 and described below is intended to be illustrative and non-limiting.

At block 1110, the artificial neural network may receive a representation of an object to be classified as a target class in a set of target classes, and may extract features of the object as described above with respect to, for example, FIGS. 3-5. The extracted features may be received by a fully-connected layer, such as a layer (e.g., input layer 370, hidden layer 380, or input layer 910) of the fully-connected layer (e.g., fully-connected layer 360 or fully-connected layer 900) preceding the output layer (e.g., output layer 390 or output layer 920) of the fully-connected layer in the artificial neural network. The fully-connected layer of the artificial neural network may include multiple fully-connected subnetworks between groups of nodes on the output layer of the fully-connected layer and nodes on the preceding layer as described above with respect to, for example FIGS. 9 and 10. Each fully-connected subnetwork may include a respective group of nodes on the output layer of the fully-connected layer and nodes on the preceding layer in the fully-connected layer. A first fully-connected subnetwork may include a first group of nodes on the output layer, where the first group of nodes may correspond to a first unknown class and a first subset of target classes in the set of target classes.

At block 1120, the artificial neural network may use the first fully-connected subnetwork and the extracted features to classify the object as belonging to one target class in the first subset of target classes or the first unknown class. The classification may include performing the weighted sum of the extracted features using the weights for the first fully-connected subnetwork at each of the first group of nodes on the output layer, and/or performing a Softmax function on the outputs of the first group of nodes on the output layer.

At block 1130, it may be determined whether the object is classified as the first unknown class. If the object is classified as one of the first subset of target classes, the classification may end. Otherwise, the classification process may proceed to block 1140.

At block 1140, the artificial neural network may use a second fully-connected subnetwork that includes a second groups of nodes on the output layer and the extracted features to classify the object as belonging to one target class in a second subset of target classes of the set of target classes or a second unknown class. The second subset of target classes may be different from the first subset of target classes and may each correspond to a node in the second group of nodes. The classification may include performing the weighted sum of the extracted features using the weights for the second fully-connected subnetwork at each of the second group of nodes on the output layer, and/or performing a Softmax function on the outputs of the second group of nodes on the output layer.

Optionally, at block 1150, it may be determined whether the object is classified as the second unknown class. If the object is classified as one of the second subset of target classes, the classification may end. Otherwise, the classification process may proceed to block 1160.

Optionally, at block 1160, if all fully-connect networks in the fully-connected layer of the artificial neural network have been used, the classification process may end. Otherwise, the classification process may go back to block 1140, where the object may be classified using a next fully-connected subnetwork, which may include a group of nodes on the output layer that corresponds to an unknown class and a subset of the target classes.

The operations described at blocks 1140, 1150, and 1160 may be performed using other fully-connected subnetworks (if any) in the fully-connected layer, until the object is classified as one of the target classes using a fully-connected subnetwork, or as the unknown class using the last fully-connected subnetwork.

Even though FIGS. 10 and 11 describe the example methods as sequential operations, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Figure 12:
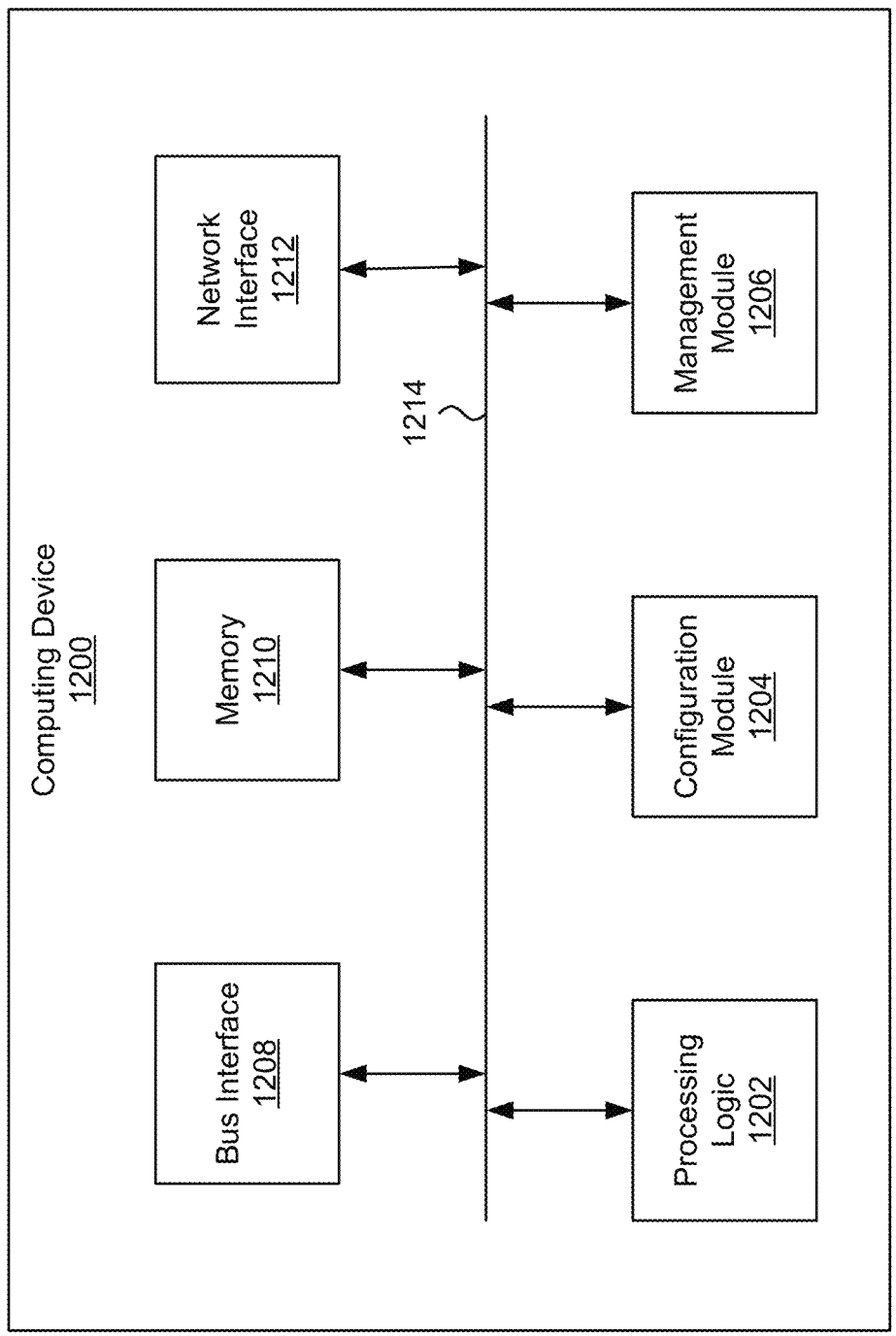
FIG. 12 illustrates an example of a computing device, according to certain aspects of the disclosure.

FIG. 12 illustrates an example of a computing device 1200. Functionality and/or several components of the computing device 1200 may be used without limitation with other embodiments disclosed elsewhere in this disclosure, without limitations. A computing device 1200 may perform computations to facilitate processing of a task. As an illustrative example, computing device 1200 can be part of a server in a multi-tenant compute service system. Various hardware and software resources of computing device 1200 (e.g., the hardware and software resources associated with provision of an image recognition service) can be allocated to a client upon request.

In one example, the computing device 1200 may include processing logic 1202, a bus interface module 1208, memory 1210, and a network interface module 1212. These modules may be hardware modules, software modules, or a combination of hardware and software. In certain instances, modules may be interchangeably used with components or engines, without deviating from the scope of the disclosure. The computing device 1200 may include additional modules, not illustrated here. In some implementations, the computing device 1200 may include fewer modules. In some implementations, one or more of the modules may be combined into one module. One or more of the modules may be in communication with each other over a communication channel 1214. The communication channel 1214 may include one or more busses, meshes, matrices, fabrics, a combination of these communication channels, or some other suitable communication channel.

The processing logic 1202 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1202 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1202 may be stored on a computer-readable storage medium, for example, in the form of a computer program. The computer-readable storage medium may be non-transitory. In some cases, the computer-readable medium may be part of the memory 1210. Processing logic 1202 may also include hardware circuities for performing artificial neural network computation including, for example, neural network processor 302, etc.

The access to processing logic 1202 can be granted to a client to provide the personal assistant service requested by the client. For example, computing device 1200 may host a virtual machine, on which an image recognition software application can be executed. The image recognition software application, upon execution, may access processing logic 1202 to predict, for example, an object included in an image. As another example, access to processing logic 1202 can also be granted as part of bare-metal instance, in which an image recognition software application executing on a client device (e.g., a remote computer, a smart phone, etc.) can directly access processing logic 1202 to perform the recognition of an image.

The memory 1210 may include either volatile or non-volatile, or both volatile and non-volatile types of memory. The memory 1210 may, for example, include random access memory (RAM), read only memory (ROM), Electrically Erasable Programmable Read-Only Memory (EEPROM), flash memory, and/or some other suitable storage media. In some cases, some or all of the memory 1210 may be internal to the computing device 1200, while in other cases some or all of the memory may be external to the computing device 1200. The memory 1210 may store an operating system comprising executable instructions that, when executed by the processing logic 1202, provides the execution environment for executing instructions providing networking functionality for the computing device 1200. The memory 1210 may also store, for example, software applications for performing artificial neural network computation. For example, memory 1210 may store software routines related to the computations of equations above. In a case where processing logic 1202 is in the form of FPGA, memory 1210 may store netlists data representing various logic circuit components of processing logic 1202.

The bus interface module 1208 may enable communication with external entities, such as a host device and/or other components in a computing system, over an external communication medium. The bus interface module 1208 may include a physical interface for connecting to a cable, socket, port, or other connection to the external communication medium. The bus interface module 1208 may further include hardware and/or software to manage incoming and outgoing transactions. The bus interface module 1208 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1208 may include the physical layer for any of these bus protocols, including a connector, power management, and error handling, among other things. In some implementations, the computing device 1200 may include multiple bus interface modules for communicating with multiple external entities. These multiple bus interface modules may implement the same local bus protocol, different local bus protocols, or a combination of the same and different bus protocols.

The network interface module 1212 may include hardware and/or software for communicating with a network. This network interface module 1212 may, for example, include physical connectors or physical ports for wired connection to a network, and/or antennas for wireless communication to a network. The network interface module 1212 may further include hardware and/or software configured to implement a network protocol stack. The network interface module 1212 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1200 may include multiple network interface modules, each configured to communicate with a different network. For example, in these implementations, the computing device 1200 may include a network interface module for communicating with a wired Ethernet network, a wireless 802.11 network, a cellular network, an Infiniband network, etc. In some embodiments, computing device 1200 may receive a set of parameters, such as the aforementioned weight vectors for generation of forget gate factor, input factor, output factor, etc. from a server through network interface module 1212.

The various components and modules of the computing device 1200, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of training an artificial neural network to classify objects into target classes, the method comprising:
   ranking the target classes of the artificial neural network based on probabilities that the objects to be classified belong to the target classes, each of the target classes corresponding to one of a set of nodes on an output layer in the artificial neural network;
   grouping the target classes and the set of nodes based on the ranking to form a plurality of groups of nodes, each group of nodes of the plurality of groups of nodes comprising a respective node corresponding to a respective unknown class and forming a respective subnetwork of a plurality of subnetworks, the plurality of subnetworks including a first subnetwork and a second subnetwork, wherein the probabilities for the target classes of the first subnetwork are greater than the probabilities for the target classes of the second subnetwork; and
   training the plurality of subnetworks by:
      labeling training samples as corresponding to one of the target classes of the first subnetwork or to the respective unknown class of the first subnetwork by labeling a first portion of the training samples that do not correspond to any of the target classes of the first subnetwork as corresponding to the respective unknown class of the first subnetwork;
      training the first subnetwork using the training samples as labeled to correspond to the target classes or the respective unknown class of the first subnetwork;
      labeling the training samples as corresponding to one of the target classes of the second subnetwork or to the respective unknown class of the second subnetwork by labeling a second portion of the training samples that do not correspond to any of the target classes of the second subnetwork as corresponding to the respective unknown class of the second subnetwork; and
      training the second subnetwork using the training samples as labeled to correspond to the target classes or the respective unknown class of the second subnetwork.

2. The method of claim 1, wherein the output layer is part of a fully-connected layer, and wherein each of the plurality of subnetworks is a fully-connected subnetwork.

3. The method of claim 1, wherein a number of the target classes of the first subnetwork is equal to N/K−1, wherein N is a number of the set of nodes on the output layer and K is a number of the plurality subnetworks.

4. The method of claim 3, wherein a number of the target classes of the second subnetwork is equal to N/K−1.

5. The method of claim 1, further comprising:
   prior to training the second subnetwork, removing the first portion of the training samples.

6. The method of claim 1, wherein the plurality of subnetworks are trained sequentially, such that the first subnetwork is trained prior to the second subnetwork.

7. The method of claim 1, wherein the artificial neural network comprises:
   a multi-layer perceptron;
   a convolutional neural network; or
   a recurrent neural network.

8. The method of claim 1, wherein the target classes comprise 10,000 or more target classes.

9. A non-transitory computer-readable medium comprising instructions that, when executed by one or more processors, cause the one or more processors to perform operations comprising:
   ranking target classes of an artificial neural network, each of the target classes corresponding to one of a set of nodes on an output layer in the artificial neural network based on probabilities that objects to be classified belong to the target classes;

grouping the target classes and the set of nodes based on the ranking to form a plurality of groups of nodes, each group of nodes of the plurality of groups of nodes comprising a respective node corresponding to a respective unknown class and forming a respective subnetwork of a plurality of subnetworks, the plurality of subnetworks including a first subnetwork and a second subnetwork, wherein the probabilities for the target classes of the first subnetwork are greater than the probabilities for the target classes of the second subnetwork; and training the plurality of subnetworks by:
labeling training samples as corresponding to one of the target classes of the first subnetwork or to the respective unknown class of the first subnetwork by labeling a first portion of the training samples that do not correspond to any of the target classes of the first subnetwork as corresponding to the respective unknown class of the first subnetwork;
training the first subnetwork using the training samples as labeled to correspond to the target classes or the respective unknown class of the first subnetwork;
labeling the training samples as corresponding to one of the target classes of the second subnetwork or to the respective unknown class of the second subnetwork by labeling a second portion of the training samples that do not correspond to any of the target classes of the second subnetwork as corresponding to the respective unknown class of the second subnetwork; and
training the second subnetwork using the training samples as labeled to correspond to the target classes or the respective unknown class of the second subnetwork.

10. The non-transitory computer-readable medium of claim 9, wherein the output layer is part of a fully-connected layer, and wherein each of the plurality of subnetworks is a fully-connected subnetwork.

11. The non-transitory computer-readable medium of claim 9, wherein a number of the target classes of the first subnetwork is equal to N/K−1, wherein N is a number of the set of nodes on the output layer and K is a number of the plurality subnetworks.

12. The non-transitory computer-readable medium of claim 11, wherein a number of the target classes of the second subnetwork is equal to N/K−1.

13. The non-transitory computer-readable medium of claim 9, wherein the operations further comprise:
prior to training the second subnetwork, removing the first portion of the training samples.

14. The non-transitory computer-readable medium of claim 9, wherein the plurality of subnetworks are trained sequentially, such that the first subnetwork is trained prior to the second subnetwork.

15. A system comprising:
one or more processors; and
a non-transitory computer-readable medium comprising instructions that, when executed by the one or more processors, cause the one or more processors to perform operations comprising:
ranking target classes of an artificial neural network, each of the target classes corresponding to one of a set of nodes on an output layer in the artificial neural network based on probabilities that objects to be classified belong to the target classes;
grouping the target classes and the set of nodes based on the ranking to form a plurality of groups of nodes, each group of nodes of the plurality of groups of nodes comprising a respective node corresponding to a respective unknown class and forming a respective subnetwork of a plurality of subnetworks, the plurality of subnetworks including a first subnetwork and a second subnetwork, wherein the probabilities for the target classes of the first subnetwork are greater than the probabilities for the target classes of the second subnetwork; and
training the plurality of subnetworks by:
labeling training samples as corresponding to one of the target classes of the first subnetwork or to the respective unknown class of the first subnetwork by labeling a first portion of the training samples that do not correspond to any of the target classes of the first subnetwork as corresponding to the respective unknown class of the first subnetwork;
training the first subnetwork using the training samples as labeled to correspond to the target classes or the respective unknown class of the first subnetwork;
labeling the training samples as corresponding to one of the target classes of the second subnetwork or to the respective unknown class of the second subnetwork by labeling a second portion of the training samples that do not correspond to any of the target classes of the second subnetwork as corresponding to the respective unknown class of the second subnetwork; and
training the second subnetwork using the training samples as labeled to correspond to the target classes or the respective unknown class of the second subnetwork.

16. The system of claim 15, wherein the output layer is part of a fully-connected layer, and wherein each of the plurality of subnetworks is a fully-connected subnetwork.

17. The system of claim 15, wherein a number of the target classes of the first subnetwork is equal to N/K−1, wherein N is a number of the set of nodes on the output layer and K is a number of the plurality subnetworks.

18. The system of claim 17, wherein a number of the target classes of the second subnetwork is equal to N/K−1.

19. The system of claim 15, wherein the operations further comprise:
prior to training the second subnetwork, removing the first portion of the training samples.

* * * * *